US007545384B2

(12) United States Patent
 Baumberg

(10) Patent No.: US 7,545,384 B2
(45) Date of Patent: Jun. 9, 2009

(54) IMAGE GENERATION METHOD AND APPARATUS

(75) Inventor: Adam Michael Baumberg, Berkshire (GB)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 11/531,626

(22) Filed: Sep. 13, 2006

(65) Prior Publication Data
 US 2007/0025624 A1   Feb. 1, 2007

Related U.S. Application Data

(62) Division of application No. 09/981,844, filed on Oct. 19, 2001, now Pat. No. 7,120,289.

(30) Foreign Application Priority Data

Oct. 27, 2000 (GB) ................................. 0026343.4
May 18, 2001 (GB) ................................. 0112204.3

(51) Int. Cl.
 *G09G 5/00* (2006.01)
(52) U.S. Cl. .................. 345/582; 345/630; 382/154
(58) Field of Classification Search ................ 382/154, 382/233; 345/422
 See application file for complete search history.

(56) References Cited

U.S. PATENT DOCUMENTS

| 5,414,803 | A | | 5/1995 | Malzbender | ................. 345/427 |
| 5,649,078 | A | * | 7/1997 | Gerth et al. | ................. 345/422 |
| 6,084,979 | A | * | 7/2000 | Kanade et al. | ............... 382/154 |
| 6,157,743 | A | * | 12/2000 | Goris et al. | ................. 382/233 |
| 6,160,557 | A | * | 12/2000 | Narayanaswami | ........... 345/422 |
| 6,204,859 | B1 | | 3/2001 | Jouppi et al. | ................. 345/592 |
| 6,271,847 | B1 | | 8/2001 | Shum et al. | ................. 345/418 |
| 6,434,265 | B1 | | 8/2002 | Xiong et al. | ................. 382/154 |
| 6,700,584 | B1 | | 3/2004 | Wood | .......................... 345/581 |

(Continued)

FOREIGN PATENT DOCUMENTS

GB   2 357 949 A   7/2001

(Continued)

OTHER PUBLICATIONS

Greene, Ned, Kass, Michael, Miller Gavin, Hierarchical Z-buffer visibility, International Conference on Computer Graphics and Interactive Techniques, Proceedings of the 20th annual conference on Computer graphics and interactive techniques, 1993.*

(Continued)

*Primary Examiner*—Xiao M Wu
*Assistant Examiner*—Phi Hoang
(74) *Attorney, Agent, or Firm*—Fitzpatrick, Cella, Harper & Scinto

(57) ABSTRACT

An image processing apparatus is disclosed in which input images are processed to generate texture map data for texture rendering a generated three-dimensional computer model of object(s) appearing in the images. In order to select the portions of the images utilised, confidence data is generated indicative of the extent portions of the surface of a model are visible in each of the images. The images are then combined utilizing this confidence data, where image data representative of different spatial frequencies are blended in different ways utilizing the confidence data.

10 Claims, 16 Drawing Sheets

U.S. PATENT DOCUMENTS

| | | |
|---|---|---|
| 7,079,680 B2 | 7/2006 | Baumberg .................. 382/154 |
| 2001/0056308 A1 | 12/2001 | Petrov et al. .................. 700/98 |
| 2002/0050988 A1 | 5/2002 | Petrov et al. ................ 345/418 |
| 2002/0085748 A1 | 7/2002 | Baumberg .................. 382/154 |
| 2003/0001837 A1 | 1/2003 | Baumberg .................. 345/419 |
| 2003/0063086 A1 | 4/2003 | Baumberg .................. 345/420 |

FOREIGN PATENT DOCUMENTS

| | | |
|---|---|---|
| GB | 2 362 793 A | 11/2001 |
| GB | 2 369 541 A | 5/2002 |
| JP | 2-121481 A | 5/1990 |
| JP | 6-259571 A | 9/1994 |
| JP | 6-348860 A | 12/1994 |
| JP | 7-230555 | 8/1995 |
| JP | 7-254072 A | 10/1995 |
| JP | 8-147494 A | 6/1996 |
| JP | 9-161100 | 6/1997 |
| JP | 11-120372 | 4/1999 |
| JP | 11-328441 A | 11/1999 |
| JP | 2000-137815 | 5/2000 |
| JP | 2000-268189 A | 9/2000 |
| JP | 2000-348196 | 12/2000 |
| JP | 2001-126084 | 5/2001 |
| WO | WO 98/18117 | 4/1998 |

OTHER PUBLICATIONS

Peter J. Neugebauer et al., "Texturing 3D Models of Real World Objects from Multiple Unregistered Photographic Views", Eurographics, vol. 18, No. 3, pp. 245-256 (1999).

Paul E. Debevec et al., "Modeling and Rendering Architecture from Photographs: A hybrid geometry—and image-based approach", SIGGRAPH 96, Computer Graphics Proceedings, Annual Conference Series, pp. 11-20 (1996).

Hendrik P. A. Lensch et al., "Automated Texture Registration and Stitching for Real World Models", pp. 317-326 IEEE: Proceedings of the Eighth Pacific Conference on Computer Graphics and Applications (PG'00) (2000).

J. D. Foley et al., "Computer Graphics Principles and Practice", Addison-Wesley Pub. Co., Second Ed., Section 16.3.2, pp. 741-744 (1997).

P. J. Sloan et al., "Importance Driven Texture Coordinate Optimization", Europgraphics '98, vol. 17, No. 3 (1998).

Wolfgang Niem et al., "Automatic Reconstruction of 3D Objects Using a Mobile Monoscopic Camera." Image and Vision Computing 17, pp. 125-134. (1999).

Peter J. Burt et al., "A Multiresolution Spline with Application to Image Mosaics." ACM Transactions on Graphics (TOG), vol. 2, No. 4, pp. 217-236 (Oct. 1983).

Frédéric Pighin et al., "Synthesizing Realistic Facial Expressions from Photographs." Proceedings of the 25th Annual Conference on Computer Graphics, pp. 1-9 (Jul. 1998).

Fausto Bernardini et al., "High-Quality Texture Reconstruction from Multiple Scans." IEEE Transactions on Visualization and Computer Graphics, vol. 7, No. 4, pp. 318-332 (Oct.-Dec. 2001).

Eyal Ofek et al., "Multiresolution Textures from Image Sequences." IEEE Computer Graphics and Applications, vol. 17, No. 2, pp. 18-29 (Mar. 1997).

Igor Guskov et al., "Multiresolution Signal Processing for Meshes." In Conference Proceedings ACM SIGGRAPH, pp. 325-334 (1999).

Matthias Eck et al., "Multiresolution Analysis of Arbitrary Meshes." In Conference Proceedings ACM SIGGRAPH, pp. 173-182 (1995).

Pedro V. Sander et al., "Texture Mapping Progressive Meshes." In Conference Proceedings ACM SIGGRAPH, pp. 409-423 (Aug. 2001).

Makoto Maruya, "Texture Map Generation from Object-Surface Data." Computer Graphics Forum, vol. 14, No. 3, pp. 397-405 (1995).

Maneesh Agrawala et al., "Efficient Image-Based Methods for Rendering Soft Shadows." Proceeding of SIGGRAPH 2000, Computer Graphics Proceedings, Annual Conference Series, pp. 375-384 (Jul. 2000).

Yizhou Yu., "Efficient Visibility Processing for Projective Texture Mapping." Computer & Graphics, vol. 23, pp. 245-253 (1999).

Reinhard Koch et al., "Multi Viewpoint Stereo from Uncalibrated Video Sequences." ECCV '98, vol. I, pp. 55-71 (Jun. 1998).

C. Rocchini et al., "Multiple Textures Stitching and Blending on 3D Objects." Eurographics Rendering Workshop, (Jun. 1999).

Hendrik P. A. Lensch, "A Silhouette-Based Algorithm for Texture Registration and Stitching." Graphical Models, vol. 63, No. 4, pp. 245-262 (2001).

Wojciech Matusik et al., "Image-Based Visual Hulls." Proceedings of SIGGRAPH 2000, pp. 369-374 (2000).

Dan Piponi et al., "Seamless Texture Mapping of Subdivision Surfaces by Model Pelting and Texture Blending." Proceeding of SIGGRAPH 2000, pp. 471-478 (Jul. 2000).

* cited by examiner

IMAGE GENERATION METHOD AND APPARATUS

This application is a divisional of U.S. patent application Ser. No. 09/981,844, filed Oct. 19, 2001 and claims benefit of the filing date of that application, and priority benefit of the filing dates of United Kingdom patent application nos. 0026343.4 and 0112204.3, filed Oct. 27, 2000 and May 18, 2001, respectively. The entire disclosure of each of those prior applications is incorporated herein by reference.

BACKGROUND OF THE INVENTION

1. Field of the Invention

The present application concerns method and apparatus for the generation of images. In particular the present application concerns method and apparatus for the generation of images of an object from a selected viewpoint from a plurality of images of the same object from other viewpoints.

2. Related Art

It is known to split two-dimensional image data into a number of frequency bands and process the different frequency band images separately. When generating images of three-dimensional objects from a number of different view of the same object, it would be desirable to be able to process image data for three dimensional objects in a similar way.

One way of extending the known processing of two-dimensional images would be to process images by:

projecting data from the available two-dimensional images on to the surface of an object;

blurring the generated textures across the surface of the three-dimensional object to obtain a low band textured surface;

subtracting the original textured surface to obtain the corresponding high band textured surface and then blending textured surfaces using the different spacial frequency information for the different bands.

However, it is not known how to perform the blurring operation for textures on the surface of a model in an efficient and consistent way. An alternative method for generating spacial frequency image data for an image of a 3D object from a selected viewpoint is therefore required.

SUMMARY OF THE INVENTION

In accordance with one aspect of the present invention there is provided a method of generating spacial frequency data for a specified view of an object from a plurality of images of said object comprising the steps of:

splitting available images of an object into a number of bands of spacial frequency information;

projecting the separate bands of spacial frequency information into the specified view; and generating spacial frequency data for said specified view utilising said projections.

By generating spacial frequency data directly from the available images of an object, a means is provided to ensure a consistent and efficient method of generating high and low frequency data for a selected image, which does not require a blurring operation for the surface of an object to be determined.

In accordance with a further aspect of the present invention there is provided an apparatus for generating spacial frequency data for a specified view of an object from a plurality of images of said object comprising:

means for splitting available images of an object into a number of bands of spacial frequency information;

means for projecting the separate bands of spacial frequency information into the specified view; and means for generating spacial frequency data for said specified view utilising said projections.

BRIEF DESCRIPTION OF THE DRAWINGS

Further aspects and embodiments of the present invention will become apparent with reference to the following description and drawings in which.

DESCRIPTION OF THE PREFERRED EMBODIMENTS

A first embodiment of will now be described in which a number of generated projected images corresponding to the same viewpoints are combined to generate composite texture map data for texture rendering a 3D computer model of object(s) appearing in the images.

First Embodiment

Figure 1:
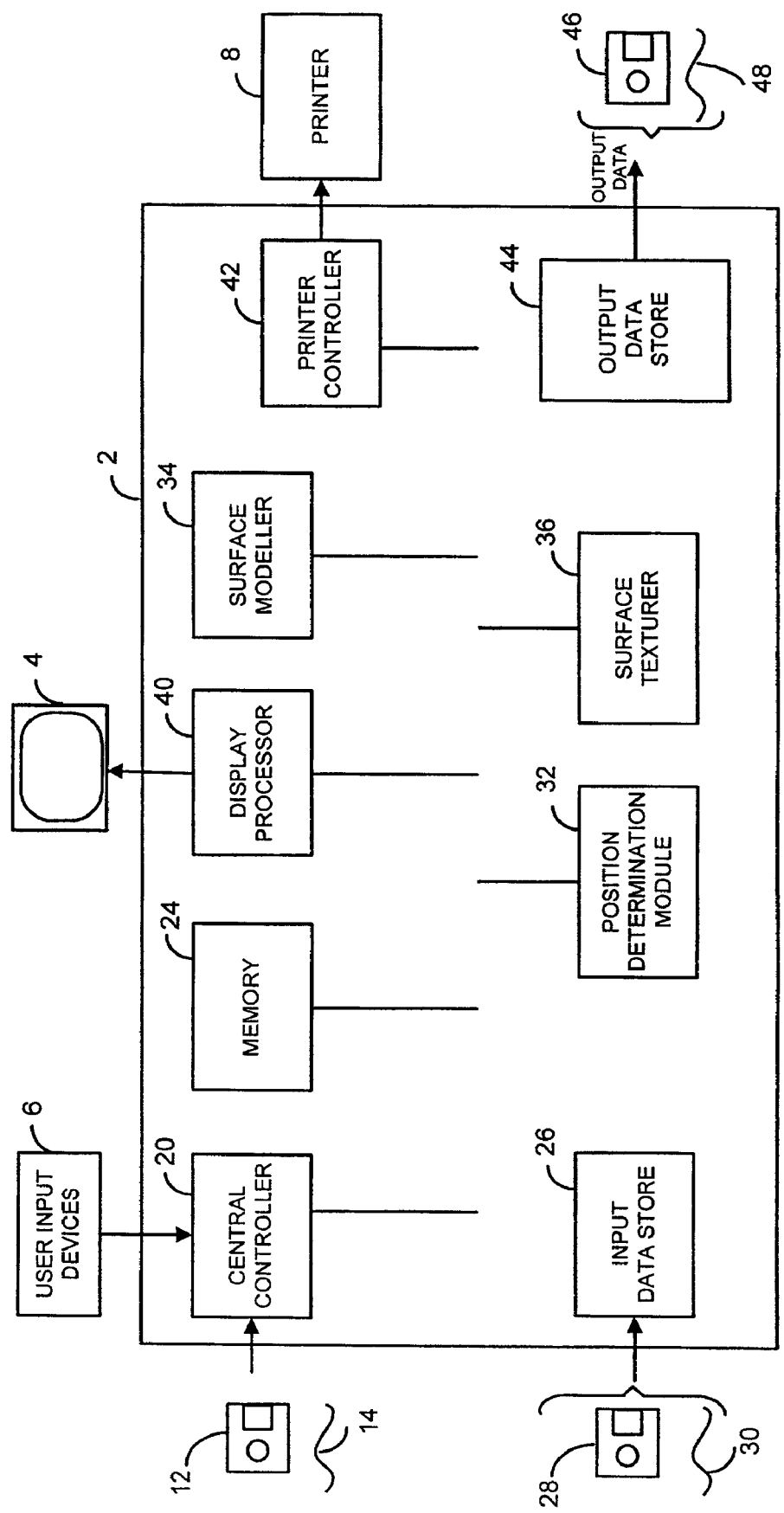
FIG. 1 is a schematic block diagram of a first embodiment of the present invention.

Referring to FIG. 1, an embodiment of the invention comprises a processing apparatus 2, such as a personal computer, containing, in a conventional manner, one or more processors, memories, graphics cards etc., together with a display device 4, such as a conventional personal computer monitor, user input devices 6, such as a keyboard, mouse etc. and a printer 8.

The processing apparatus 2 is programmed to operate in accordance with programming instructions input, for example, as data stored on a data storage medium, such as disk 12, and/or as a signal 14 input to the processing apparatus 2, for example from a remote database, by transmission over a communication network (not shown) such as the Internet or by transmission through the atmosphere, and/or entered by a user via a user input device 6 such as a keyboard.

As will be described in more detail below, the programming instructions comprise instructions to cause the processing apparatus 2 to become configured to process input data defining a plurality of images of a subject object recorded from different view points. The input data then is processed to generate data identifying the positions and orientations at which the input images were recorded. These calculated positions and orientations and the image data are then used to generate data defining a three-dimensional computer model of the subject object.

When programmed by the programming instructions, processing apparatus 2 effectively becomes configured into a number of functional units for performing processing operations. Examples of such functional units and their interconnections are shown in FIG. 1. The units and interconnections illustrated in FIG. 1 are, however, notional and are shown for illustration purposes only to assist understanding; they do not necessarily represent the exact units and connections into which the processor, memory etc. of the processing apparatus 2 become configured.

Referring to the functional units shown in FIG. 1, a central controller 20 processes inputs from the user input devices 6, and also provides control and processing for the other functional units. Memory 24 is provided for use by central controller 20 and the other functional units.

Data store 26 stores input data input to the processing apparatus 2 for example as data stored on a storage device, such as disk 28, as a signal 30 transmitted to the processing apparatus 2, or using a user input device 6. The input data defines a plurality of colour images of one or more objects recorded at different positions and orientations. In addition, in this embodiment, the input data also includes data defining the intrinsic parameters of the camera which recorded the images, that is, the aspect ratio, focal length, principal point (the point at which the optical axis intersects the imaging plane), first order radial distortion coefficient, and skew angle (the angle between the axes on the pixel grid; because the axes may not be exactly orthogonal).

The input data defining the input images may be generated for example by downloading pixel data from a digital camera which recorded the images, or by scanning photographs using a scanner (not shown). The input data defining the intrinsic camera parameters may be input by a user using a user input device 6.

Position determination module 32 processes the input images received by the input data store 26 to determine the relative positions and orientations of camera view points from which image data of an object represented by the image data have been obtained. In this embodiment, this is achieved in a conventional manner by identifying and matching features present in the input images and calculating relative positions of camera views utilising these matches.

Surface modeller 34 processes the data defining the input images and the data defining the positions and orientations at which the images were recorded to generate data defining a 3D computer wire mesh model representing the actual surface(s) of the object(s) in the images. In this embodiment this 3D model defines a plurality of triangles representing the surface of the subject object modelled.

Surface texturer 36 generates texture data from the input image data for rendering onto the surface model produced by surface modeller 34. In particular, in this embodiment the surface texturer 36 processes the input image data to generate six texture maps comprising six views of a subject object as viewed from a box bounding the subject object. These generated texture maps are then utilized to texture render the surface model so that images of a modelled subject object from any viewpoint may be generated. The processing of the surface texturer 36 to generate these texture maps from the input image data will be described in detail later.

Display processor 40, under the control of central controller 20, displays instructions to a user via display device 4. In addition, under the control of central controller 20, display processor 40 also displays images of the 3D computer model of the object from a user-selected viewpoint by processing the surface model data generated by surface modeller 34 and rendering texture data produced by surface texturer 36 onto the surface model.

Printer controller 42, under the control of central controller 30 causes hard copies of images of the 3D computer model of the object selected and displayed on the display device 4 to be printed by the printer 8.

Output data store 44 stores the surface model and texture data therefor generated by surface modeller 34 and surface texturer 36. Central controller 20 controls the output of data from output data store 44, for example as data on a storage device, such as disk 46, or as a signal 48.

The structure and processing of the surface texturer 36 for generating texture data for rendering onto a surface model produced by the surface modeller 34 will now be described in detail.

Canonical Texture Maps

When a plurality of images of a subject object recorded from different viewpoints are available, this provides a large amount of data about the outward appearance of the subject object. Where images are recorded from different viewpoints, these images provide varying amounts of data for the different portions of the subject object as those portions are visible to a lesser or greater amount within the images. In order to create a model of the appearance of an object, it is necessary to process these images to generate texture data so that a consistent texture model of a subject object can be created.

In this embodiment this is achieved by the surface texture 36 which processes the input image data of a subject object recorded from different viewpoints in order to generate texture data for rendering the surface model produced by the surface modeller 34. In this embodiment this texture data comprises six texture maps, the six texture maps comprising views of subject object from the six faces of a cuboid centred on the subject object.

Figure 2:
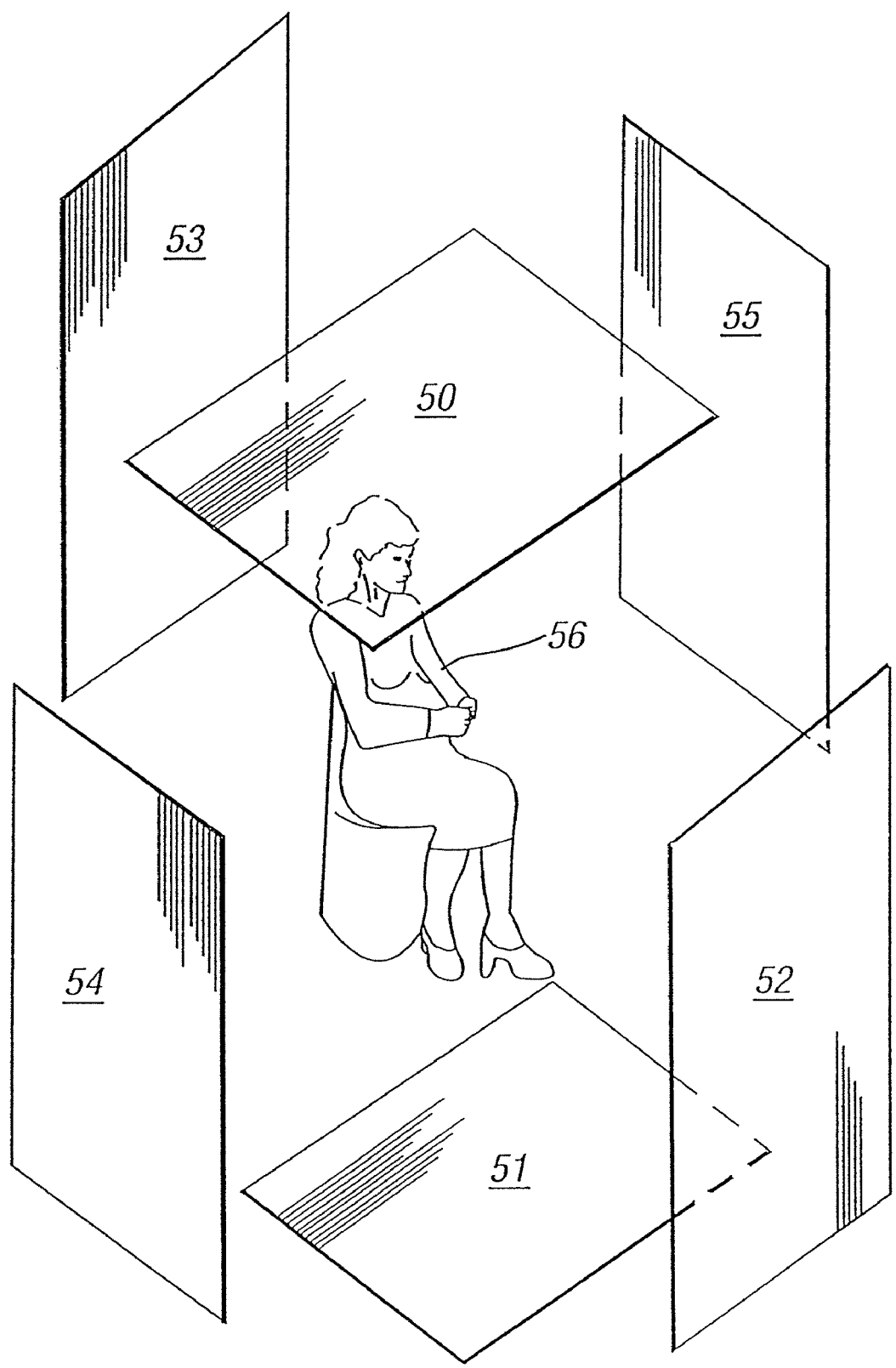
FIG. 2 is an exemplary illustration of the position an orientation of six texture maps bounding an exemplary subject object.

FIG. 2 is an exemplary illustration of the position and orientation of six texture maps 50-55 bounding an exemplary subject object 56. In this embodiment the six texture maps comprise texture maps for six canonical views of an object being views of the object from the top 50, bottom 51, front 52, back 53, left 54 and right 55.

The six canonical views 50-55 comprise three pairs 50,51; 52,53; 54,55 of parallel image planes, centred on the origin of the coordinate system of the model, with each of the three pairs of image planes aligned along one of the three coordinate axes of the coordinate system respectively. The relative positions of the viewpoints of the canonical views 50-55 are then selected so that relative to the size of the model 56 of the subject object created by the surface modeller 34, the distance away from the object is selected so that the canonical views are equally spaced from the centre of the object and the extent of an object as viewed from each image plane is no more than an threshold number of pixels in extent. In this embodiment this threshold is set to be 512 pixels. Each of the texture maps for the model is then defined by a weak perspective projection of the subject object 56 onto the defined image planes.

After image data for each of the six canonical views 50-55 has been determined, image data of the model 56 of the subject object from any viewpoint can then be generated using conventional texture rendering techniques, where texture rendering data for each portion of the surface of the model 56 is generated utilizing selected portions of the canonical views 50-56.

By generating texture data for a model of a subject object in this way the total number of required texture maps is limited to the six canonical views 50-56. Furthermore, since each of the canonical views corresponds to a view of the projection of a real world object the canonical views 50-55 should be representative of realistic views of the subject object and hence be suited for compression by standard image compression algorithms such as JPEG which are optimised for compressing real world images.

As generated images of a model of a subject object may obtain texture rendering data from any of the six canonical texture maps, it is necessary to generate all of the texture maps in such a way that they are all consistent with one another. Thus in this way where different portions of an image of a subject object are rendered utilizing texture maps from different views no noticeable boundaries arise. As for any 3D object not all of the surface of a subject object from all six canonical views 50-55 will be visible in any single input image, it is necessary for the surface texture 36 to combine image data from the plurality of images available to generate texture maps for these six consistent views 50-55.

Prior to describing in detail the processing by the surface texturer 36 which enables a set of six consistent texture maps to be generated from the available input images, the structure of the surface texturer 36 in terms of notional functional processing units will now be described.

Structure of Surface Texturer

Figure 3:
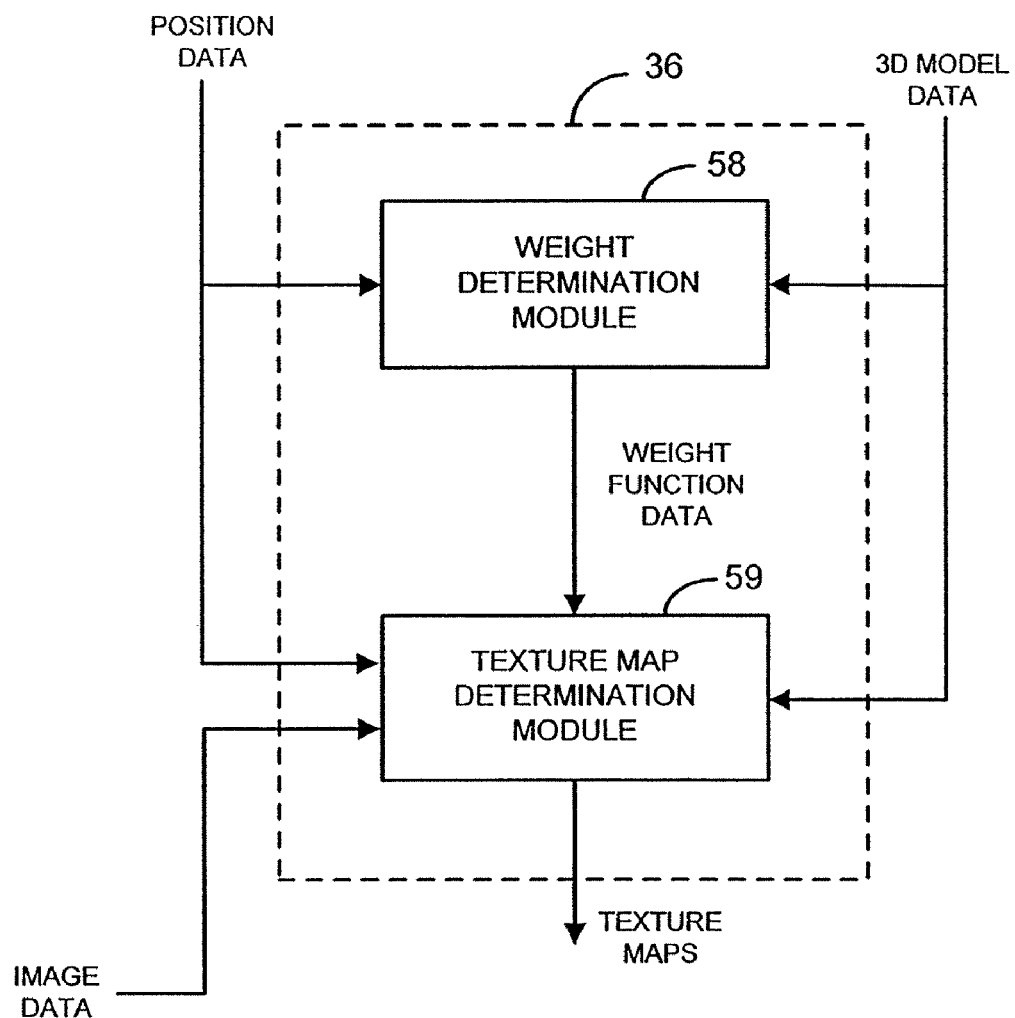
FIG. 3 is a schematic block diagram of the surface texturer of FIG. 1.

FIG. 3 is a schematic block diagram of the surface texturer 36 in accordance with this embodiment of the present invention. In this embodiment, the surface texturer 36 comprises a weight determination module 58 and a texture map determination module 59.

In order to select portions of available image data to be utilized to generate the six canonical texture maps 50-55 the surface texture 36 utilizes position data generated by the position determination module 32 identifying the viewpoints in which data has been obtained and 3D model data output by the surface model. This position data and 3D model data is processed by the weight determination module 58 which initially determines the extent to which portions of the surface of the subject object being modelled are visible in each of the available images. The weight determination module 58 then utilizes this determination to generate weight function data identifying a relative preference for utilizing the available input images for generating texture data for each portion of the surface of the model of the subject object.

This weight function data is then passed to the texture map determination module 59 which processes the weight function data together with the position data generated by the position determination module 32, the model data generated by the surface modeller 34 and the available image data stored within the input data store 26 to generate a set of six consistent texture maps for the canonical views 50-55.

Generation of Weight Function Data

The processing of the weight determination module 58 generating weight function data indicative of relative preferences for utilizing different input images for generating texture data for different portions of a model of a subject object will now be described in detail with reference to FIGS. 4-9, 10A and 10B.

Figure 4:
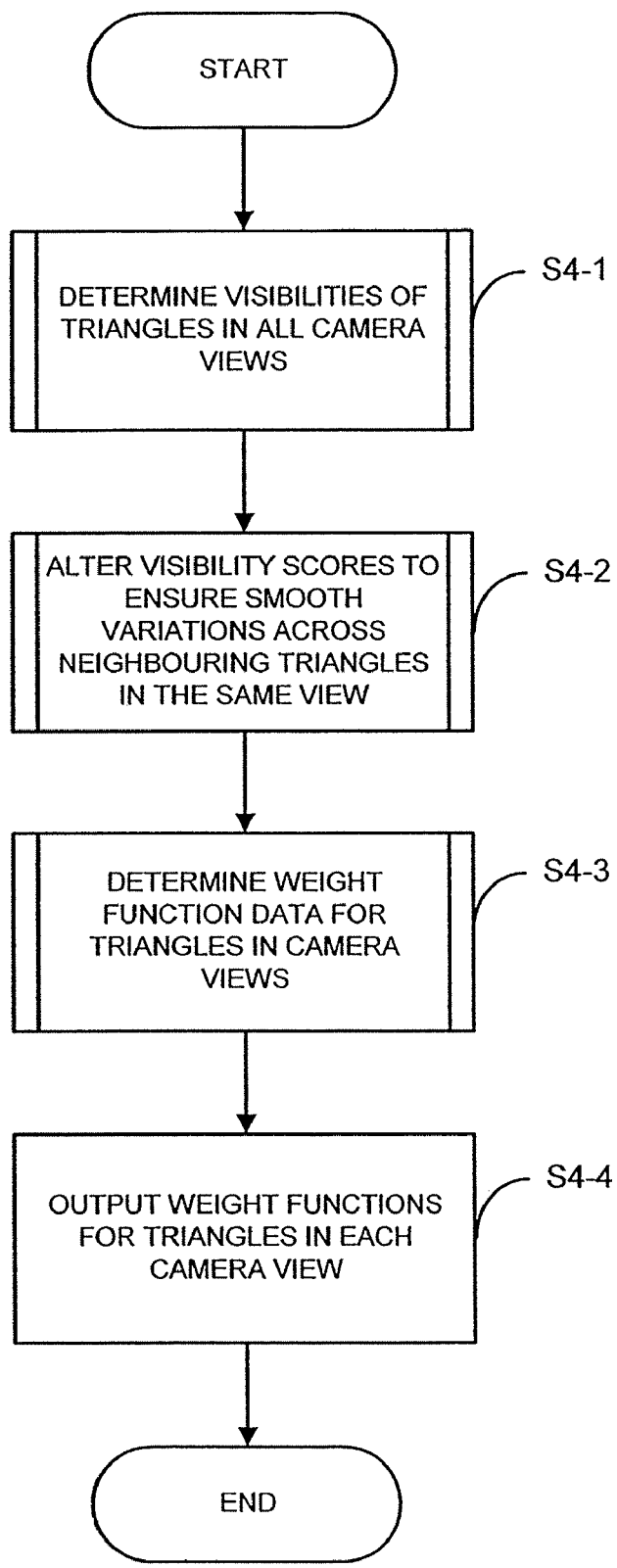
FIG. 4 is a flow diagram of the processing of the weight determination module of FIG. 3.

FIG. 4 is a flow diagram of the processing of the weight determination module 58.

Initially the weight determination module 58 determines (S4-1) data indicative of the extent to which each of the triangles of the 3D model generated by the surface modeller 34 is visible in each of the images in the input store 26.

It is inevitable that for any particular input image, some portions of the subject object represented by triangles within the three dimensional model generated by the surface model 34 will not be visible. However, the same triangles may be visible in other images. Realistic texture data for each part of the surface of the 3D model can therefore only be generated by utilizing the portions of different items of image data where corresponding portions of the surface of a subject object are visible. Thus by determining which triangles are visible within each image potential sources of information for generating texture map data can be identified.

Additionally, it is also useful to determine the extent to which each triangle is visible in the available images. In this way it is possible to select as preferred sources of image data for generating portions of texture maps, images where particular triangles are clearly visible, for example in a close up images, rather than images where a triangle whilst visible is viewed only at an acute angle, or from a great distance.

Figure 5:
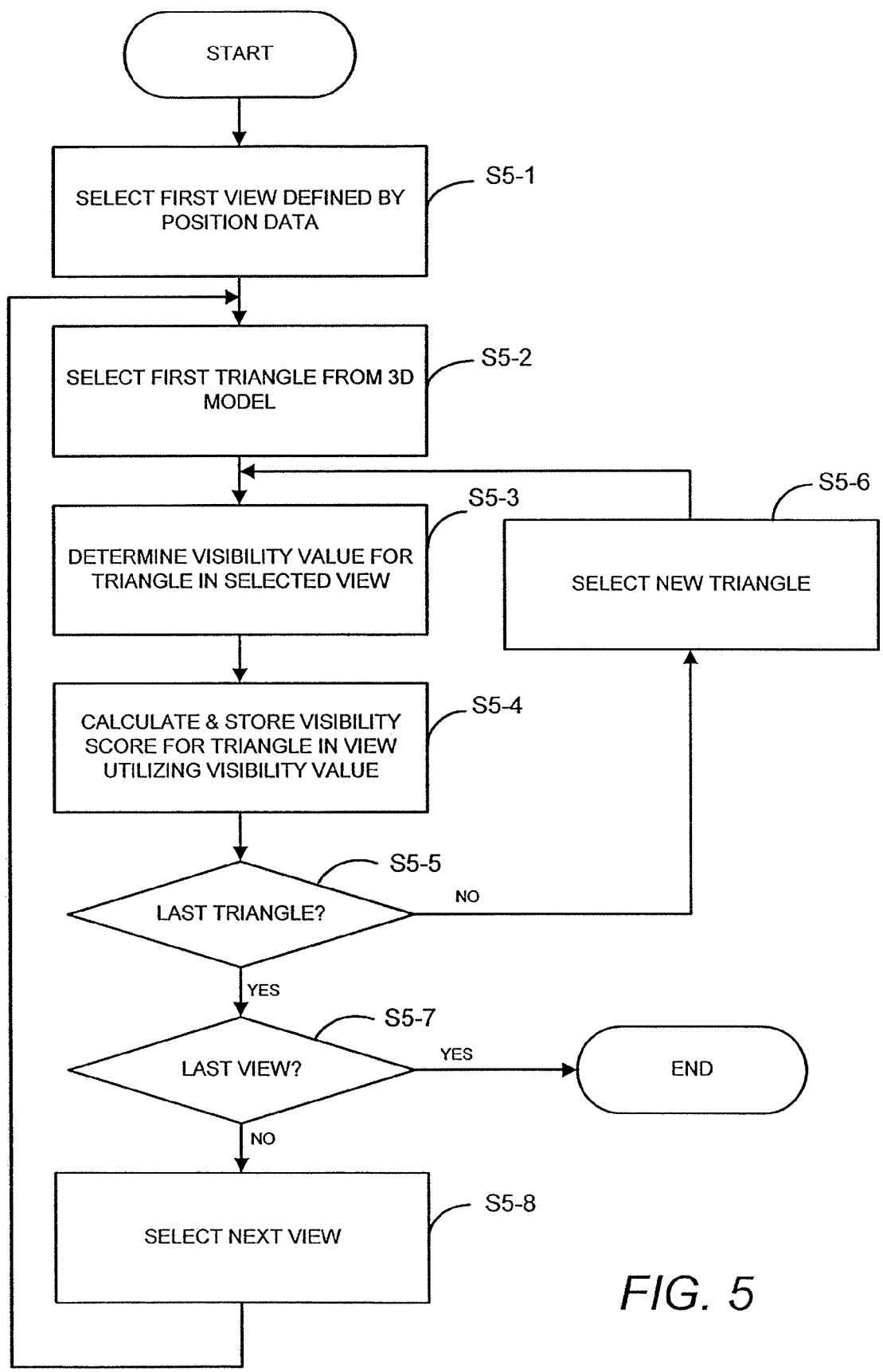
FIG. 5 is a flow diagram of processing to determine the visibility of portions of the surface of an object in input images.

FIG. 5 is a flow diagram illustrating in detail of the processing of the weight determination module 58 to determine the visibility of triangles in input images, utilizing the 3D model data generated by the surface modeller 34 and the position data for the input images determined by the position determination module 32.

Initially (S5-1) the weight determination module 58 selects the first view for which position data has been generated by the position determination module 32.

The weight determination module 58 then selects (S5-2) the first triangle of the 3D model generated by the surface modeller 34.

The weight determination module 58 then (S5-3) determines a visibility value for the triangle being processed as seen from the perspective defined by the position data being processed.

In this embodiment this is achieved by utilizing conventional Open GL calls to render the 3D model generated by the surface modeller 34 as seen from the perspective defined by the position data of the image being processed. The generated image data is then utilized to calculate the visibility value.

Specifically, initially all of the triangles of the 3D model viewed from the viewpoint defined by the selected position data are rendered using a single colour with Z buffering enabled. This Z buffer data is then equivalent to a depth map. The triangle being processed is then re-rendered in a different colour with the Z buffering disabled. The selected triangle is then once again re-rendered utilizing a third colour with the Z buffering re-enabled so as to utilize the depth values already present in the Z buffer. When re-rendering the glPolygonOffset OpenGL function call is then utilized to shift the triangle slightly towards the defined camera viewpoint defined by the position data to avoid aliasing effects.

A visibility value for the triangle being processed as viewed from the viewpoint defined by the currently selected position data is then determined by calculating the number of pixels in the image rendered in the second and third colours.

Specifically, if there are any pixels corresponding to the second colour in the generated image data, these are parts of the currently selected triangle that are occluded by other triangles and hence the selected triangle is partially hidden from the viewpoint defined by the position data. A visibility value for the triangle as perceived from the defined viewpoint is then set for the triangle where:

$$\text{visibility value} = 0 \text{ if } \frac{\text{no pixels in 3rd colour}}{\text{no pixels in 2nd or 3rd colour}} < \text{threshold}$$

$$\text{visibility value} = \frac{\left[\frac{\text{no pixels in 3rd colour}}{\text{no pixels in 2nd or 3rd colour}}\right] - \text{threshold}}{1 - \text{threshold}} \text{ otherwise}$$

Where the threshold is a value in this embodiment set to 0.75.

Thus in this way, where the entirety of a triangle is visible within an image a visibility value of one is associated with the triangle and position data. Where a triangle is only slightly occluded by other triangles when viewed from the position defined by the position data being processed, i.e. the fraction of pixels rendered in the third colour relative to the total number of pixels rendered in either the second or third colour is greater than the threshold but less than one, a visibility value of less than one is associated with the triangle at image position. Where the fraction of pixels rendered in the third colour relative to the total is less than the threshold value a visibility value of zero is assigned to the triangle as viewed from the position defined by the position data.

The processing of the weight determination module 58 to colour a triangle by rendering and a triangle utilizing the stored values in the Z buffer as previously described enables triangles to be processed even if two small adjacent triangles are mapped to the same pixel in the selected viewpoint. Specifically, if triangle depths are similar for triangles corresponding to the same portion of an image, the glPolygonOffset call has the effect of rendering the second colour in the front of other triangles the same distance from the selected viewpoint. Thus when the visibility of the selected triangle is determined, the triangle is only given a lower visibility value if it is obscured by other triangles closer to the defined viewpoint and not merely obscured by the rendering of triangles at the same distance to the same portion of an image.

After the visibility value for a triangle in the selected view has been determined, the weight determination module 58 then (S5-4) calculates and stores a visibility score for the triangle in the selected viewpoint utilizing this visibility value.

By calculating the visibility value in the manner described above, a value indicative of the extent to which a triangle in a model is or is not occluded from the selected viewpoint is determined. Other factors, however, also effect the extent to which use of particular portion image data for generating texture data may be preferred. For example, close up images are liable to contain more information about the texture of an object and therefore may be preferable sources for generating texture data. A further factor which may determine whether a particular image is preferable to use for generating texture data is the extent to which a portion of the image is viewed at oblique angle. Thus in this embodiment a visibility score for a triangle in a view is determined by the weight determination module 58 utilizing the following equation:

$$\text{visibility score} = \frac{\text{visibility value} * \cos\theta}{\text{distance}}$$

here $\theta$ is the angle of incidence of a ray from the optical centre of the camera defining the image plane as identified by the position data being processed to the normal of the centroid of the selected triangle and the distance is the distance between the centroid of selected triangle and the optical centre of the camera.

Thus in this way in this embodiment the amount of occlusion, the obliqueness of view and the distance between image plane and a triangle being modelled all effect the visibility score. In alternative embodiments either only some of these factors could be utilized or alternatively greater weight could be placed on any particular factor.

After a visibility score for a particular triangle as perceived from a particular viewpoint has been calculated and stored, the weight determination module 58 then (S5-5) determines whether the triangle for which data has just been stored is the last of the triangles identified by the model data generated by the surface modeller 34. If this is not the case the weight determination module 58 then proceeds to select (S5-6) the next triangle of the model data generated by the surface modeller 34 and then determines a visibility value (S5-3) and calculates and stores a visibility score (S5-4) for that next triangle.

When the weight determination module 58 determines that the triangle for which a visibility score has been stored is the last triangle of the 3D model data generated by the surface modeller 34, the weight determination module 58 then (S5-7) determines whether the currently selected position data defining the position of an input image stored within the input data store 28 is the last of the sets of position data generated by the position determination module 32. If this is not the case the weight determination module 58 then selects (S5-8) the next set of position data to generate and store visibility scores for each of the triangles as perceived from that new position (S5-2-S5-7).

Thus in this way the weight determination module 58 generates and stores visibility scores for all triangles as perceived from each of the viewpoints corresponding to viewpoints of input image data in the input data store 26.

Returning to FIG. 4 after visibility scores have been stored for each of the triangles as perceived from each of the camera views corresponding to position data generated by the position determination module 32, the weight determination module 58 then (S4-2) proceeds to alter the visibility scores for the triangles perceived in each view to ensure smooth variation in the scores across neighbouring triangles.

In this embodiment of the present invention the visibility scores are utilized to generate weight functions indicative of a relative preference for using portions of different input images stored within the input data store 26 for generating texture rendering data. In order that the selection of image data from different input images does not result in the creation of noticeable boundaries where different input images are used to generate the texture data, it is necessary to generate weight function data which generates a continuous and reasonably smooth weight function so that image data from different sources is blended into one another. As in this embodiment the triangles forming the 3D model data can be of significantly different sizes, a first stage in generating such a smooth weighting function is to average weighting values across areas of the model to account for this variation in triangle size.

Figure 6:
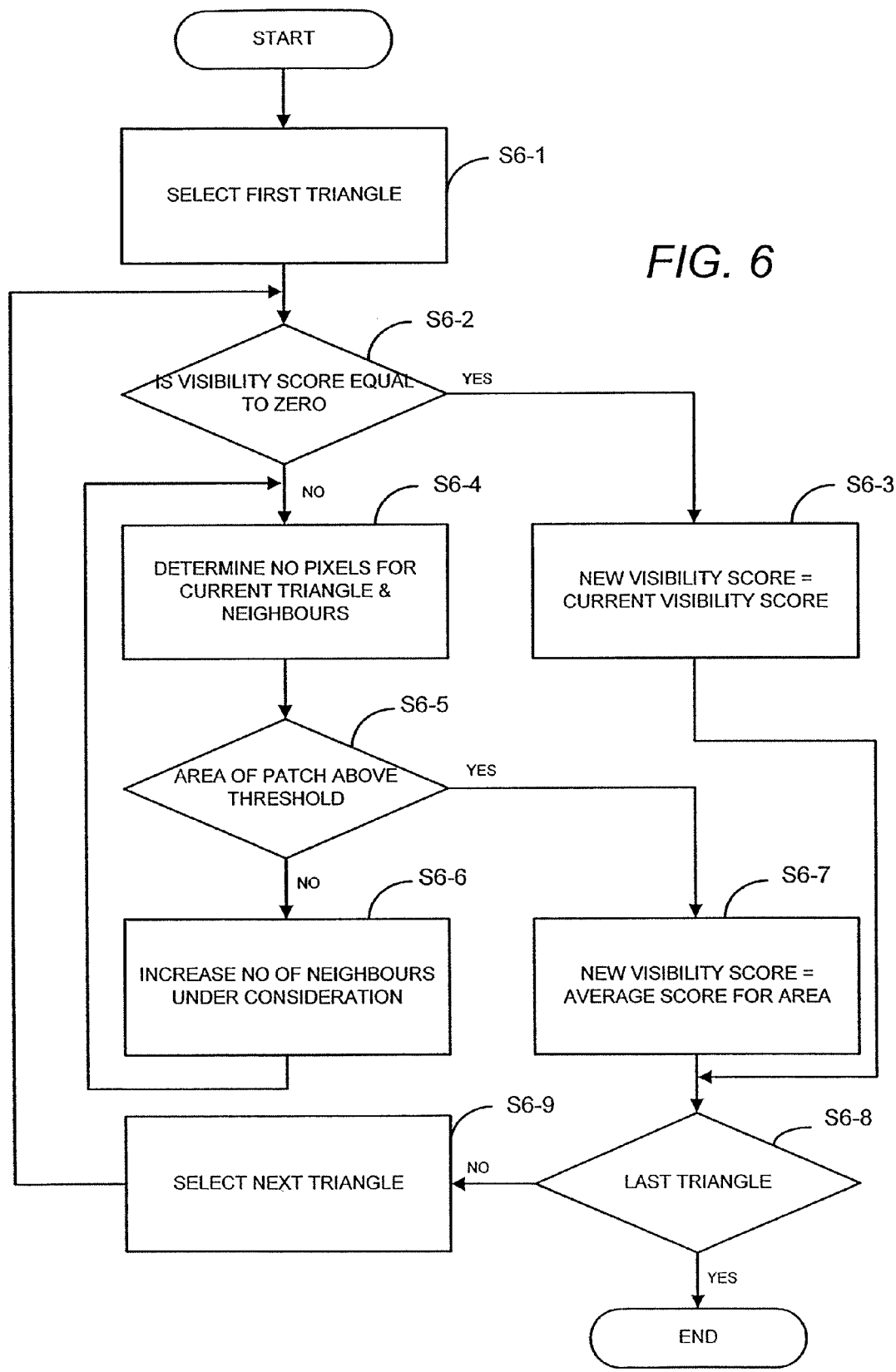
FIG. 6 is a flow diagram of the processing of visibility scores to ensure relatively smooth variation of the scores.

FIG. 6 is a flow diagram of the detailed processing of the weight determination module 58 to alter the visibility score associated with triangles as perceived from a particular viewpoint. The weight determination module 58 repeats processing illustrated by FIG. 6 for each of the sets of visibility score data associated with triangles corresponding to each of the views for which image data is stored within the input store 26 so that visibility score data associated with adjacent triangles as perceived from each viewpoint identified by position data determined by the position determination module 32 varies relatively smoothly across the surface of the model.

Initially (S6-1), the weight determination module 58 selects the first triangle identified by 3D model data output from the surface modeller 34.

The weight determination module 58 then (S6-2) determines whether the stored visibility score of the visibility of that triangle as perceived from the view being processed is set to zero. If this is the case no modification of the visibility score is made (S6-3). This ensures that the visibility scores associated with triangles which have been determined to be completely occluded or substantially occluded from the viewpoint being processed remain associated with a visibility score of zero, and hence are not subsequently used to generate texture map data.

If the weight determination module 58 determines (S6-2) that the visibility score of the triangle being processed is not equal to zero the weight determination module 58 then (S6-4) determines the surface area of the triangle from the 3D vertices using standard methods. The weight determination module then (S6-5) determines whether the total surface area exceeds the threshold value. In this embodiment the threshold value is set to be equal to the square of 5% of the length of the bounding box defined by the six canonical views 50-55.

If the weight determination module 58 determines that the total surface area does not exceed this threshold the weight determination module then (S6-6) selects the triangles adjacent to the triangle under consideration, being those triangles having 3D model data sharing two vertices with the triangle under consideration. The weight determination module 58 then calculates (S6-4, S6-5) the total surface for the selected triangle and those adjacent to the selected triangle to determine once again whether the number of pixels the projection of this area onto the image plane corresponding to the viewpoint against which triangles are being processed exceeds the threshold value. This process is repeated until the total surface area corresponding to the selected triangles exceeds the threshold.

When the threshold is determined to be exceeded, the weight determination module 58 then (S6-7) sets as an initial revised visibility score for the central triangle, where the initial revised score is equal to the average visibility score associated with all the currently selected triangles weighted by surface.

A threshold value, typically set to 10% of the maximum unmodified weight is then subtracted from this revised initial visibility score. Any negative values associated with triangles are then set to zero. This threshold causes triangles associated with low weights to be associated with a zero visibility score. Errors in calculating camera position and hence visibility scores might result in low weights being assigned to triangles where surfaces are not in fact visible. The reduction of visibility scores in this way ensures that any such errors do not introduce subsequent errors in generated texture map data. The final revised visibility score for the triangle is then stored.

Figure 7:
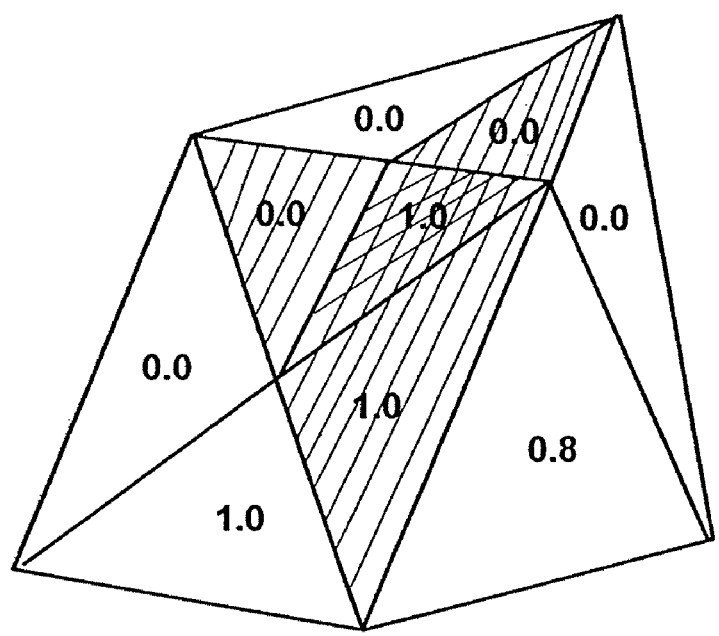
FIGS. 7 and 8 are an exemplary illustration of the processing of an area of a model ensuring smooth variation in scores.
Figure 8:
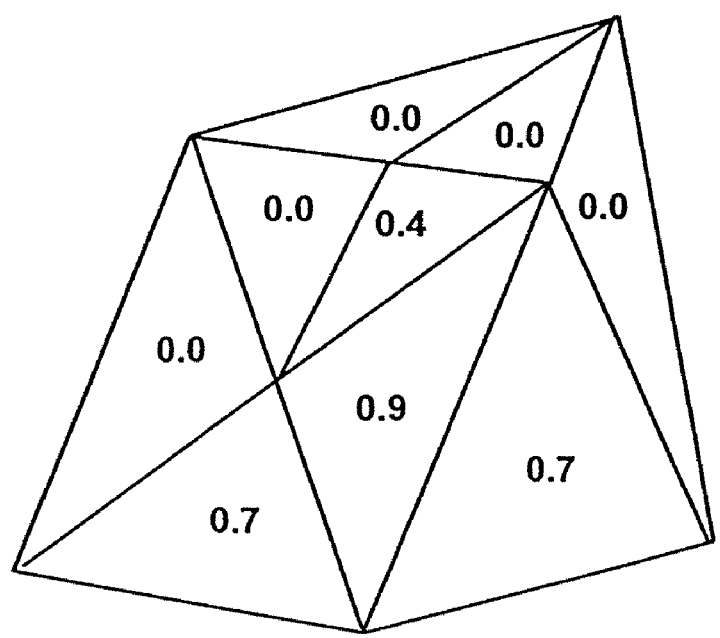

FIGS. 7 and 8 are an exemplary illustration of the processing of an area of a model in order to revise the visibility scores to ensure a smooth variation in scores regardless of the size of the triangles.

FIG. 7 is an exemplary illustration of an area of a model comprising nine triangles, each triangle associated with a visibility score corresponding to the number appearing within respective triangles.

When the triangle corresponding to the central cross hatched triangle with a number 1.0 in the centre of the FIG. 7 is processed initially the area of the triangle is determined. If this area is determined to be below the threshold value, the adjacent triangles, the shaded triangles in FIG. 7, are selected and the area corresponding to the crossed hatched triangle and the shaded triangles is then determined.

If this value is greater than the threshold value an area weighted average to the triangles is determined after subtracting the threshold from this score and setting any negative value to zero the final value is stored as the revised visibility score for the central triangle.

FIG. 8 is an exemplary illustration of the area of a model corresponding to the same area illustrated in FIG. 7 after all of the visibility scores for the triangles have been processed and modified where necessary. As can be seen by comparing the values associated with triangles in FIG. 7 and FIG. 8, wherever a triangle is associated with a zero in FIG. 7 it remains associated with a zero in FIG. 8. However the variation across the remaining triangle is more gradual than the variation illustrated in FIG. 7, as these new scores correspond to area weighted averages of the visibility scores in FIG. 7.

Returning to FIG. 6 after a revised visibility score has been determined for a triangle the weight determination module 58 then determines (S6-8) whether all of the visibility scores for the triangles in a model, as seen from a viewpoint have been processed. If this is not the case the weight determination module 58 then (S6-9) selects the next triangle for processing.

Thus in this way all of the visibility scores associated with triangles are processed so that visibility scores gradually vary across the surface of the model and drop to zero for all portions of a model which are not substantially visible from the viewpoint for which the visibility scores have been generated.

Returning to FIG. 4, after the visibility scores for all of the triangles in all of the views have been amended were necessary to ensure a smooth variation of visibility scores across the entirety of the model, the weight determination module 58 then (S4-3) calculates weight function data for all of the triangles in all of the views so that a smooth weight function indicative of the visibility of the surface of the model as seen from each defined viewpoint can be generated.

The processing of the weight determination module 58 for generating weight function data for a model for a single view will now be described in detail with reference to FIGS. 9, 10A and 10B. This processing is then repeated for the other views so that weight function data for all of the views is generated.

Figure 9:
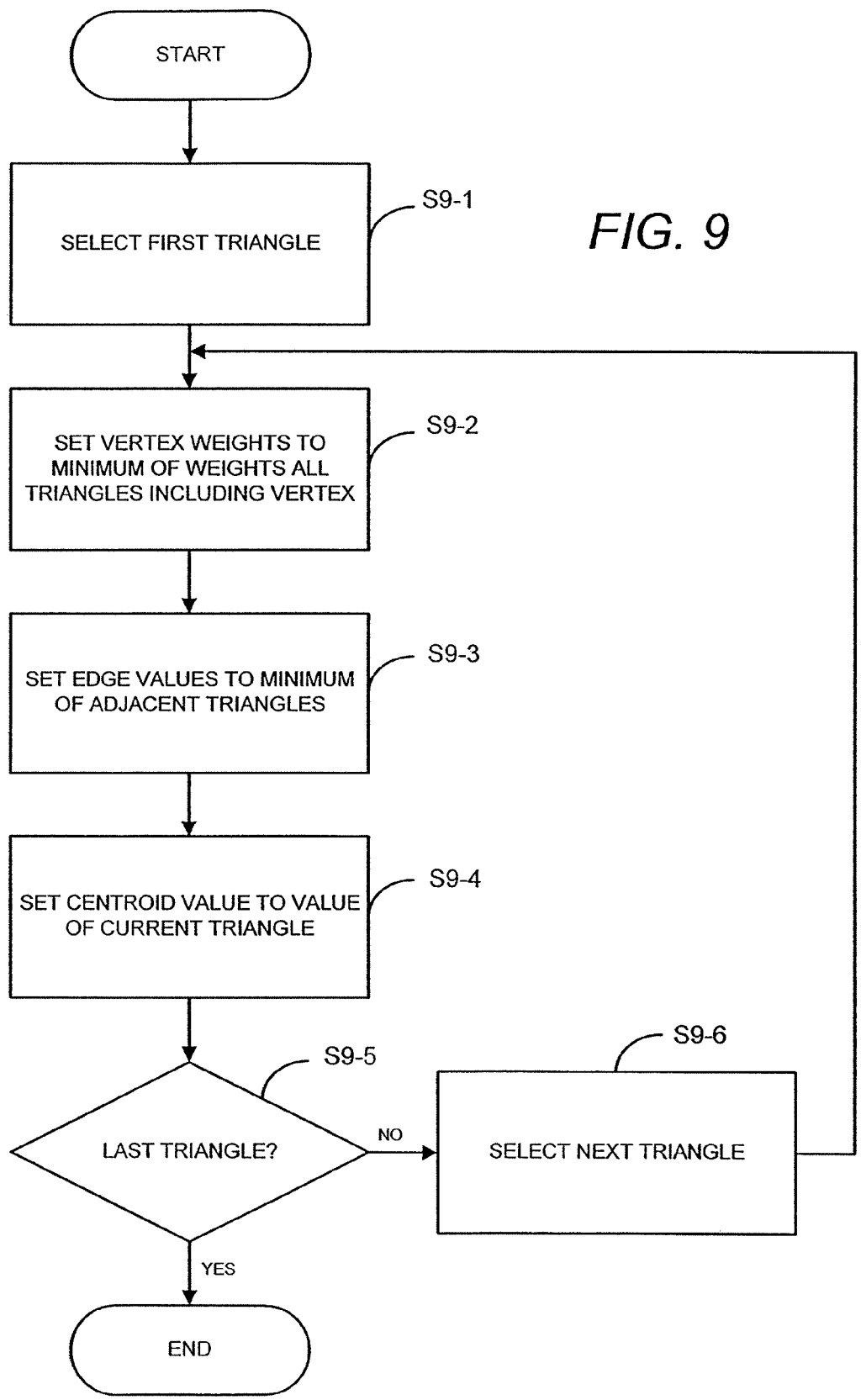
FIG. 9 is a flow diagram of the generation of weight function data.

FIG. 9 is a flow diagram of the processing of the weight determination module 58 to generate weight function data for the surface of a model defined by 3D model data received from the surface modeller 34 for a view as defined by one set of position data output by the position determination module 32 for which visibility scores have been determined and modified.

Initially the weight determination module 58 selects (S9-1) the first triangle of the model. The weight determination module 58 then (S9-2) determines for each of the vertices of the selected triangle the minimum visibility score associated with triangles in the model sharing that vertex. These minimum visibility scores are then stored as weight function data for the points of the model corresponding to those vertices.

The weight determination module 58 then (S9-3) determines for each of the edges of the selected triangle the lesser visibility score of the currently selected triangle and the adjacent triangle which shares that common edge. These values are then stored as weight function data defining the weight to be associated with the mid point of each of the identified edges.

The weight determination module 58 then (S9-4) stores as weight function data the visibility score associated with the currently selected triangle as the weight function to be associated with the centroid of the selected triangle.

By allotting weight function data for the vertices, edges and centroids of each of the triangles for the models generated by the surface modeller 34, values for the entirety of the surface of the model of an object can then be determined by interpolating the remaining points of the surface of the model as will be described later.

Figure 10A:
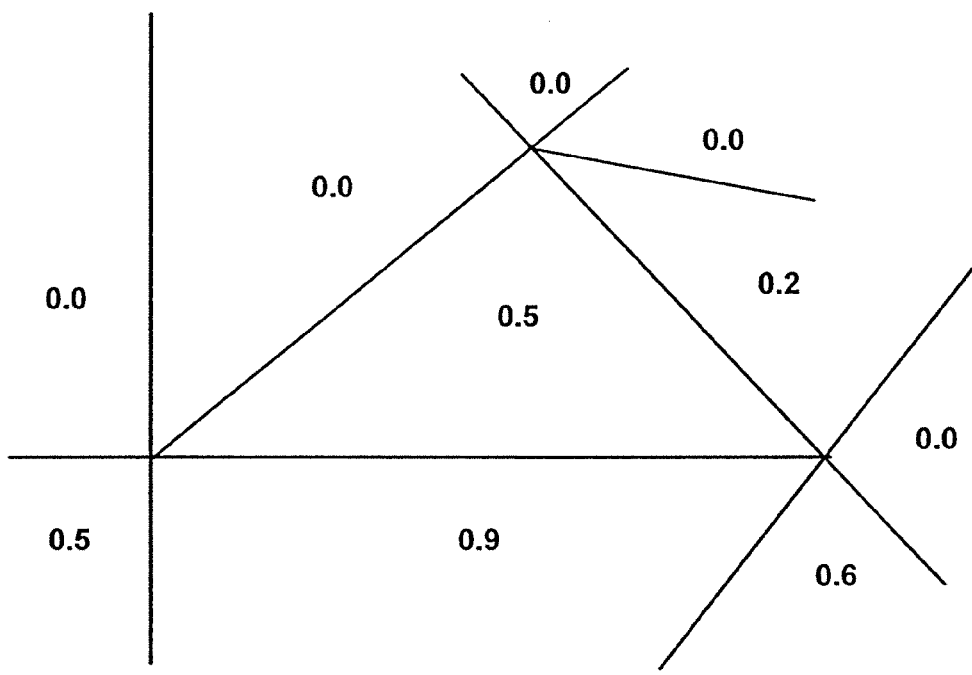
FIGS. 10A and 10B are an illustrative example of a selection of triangles for associated visibility scores and generated weight function data.

FIG. 10A is an illustrative example of a selection of triangles each associated with a visibility score.

Figure 10B:
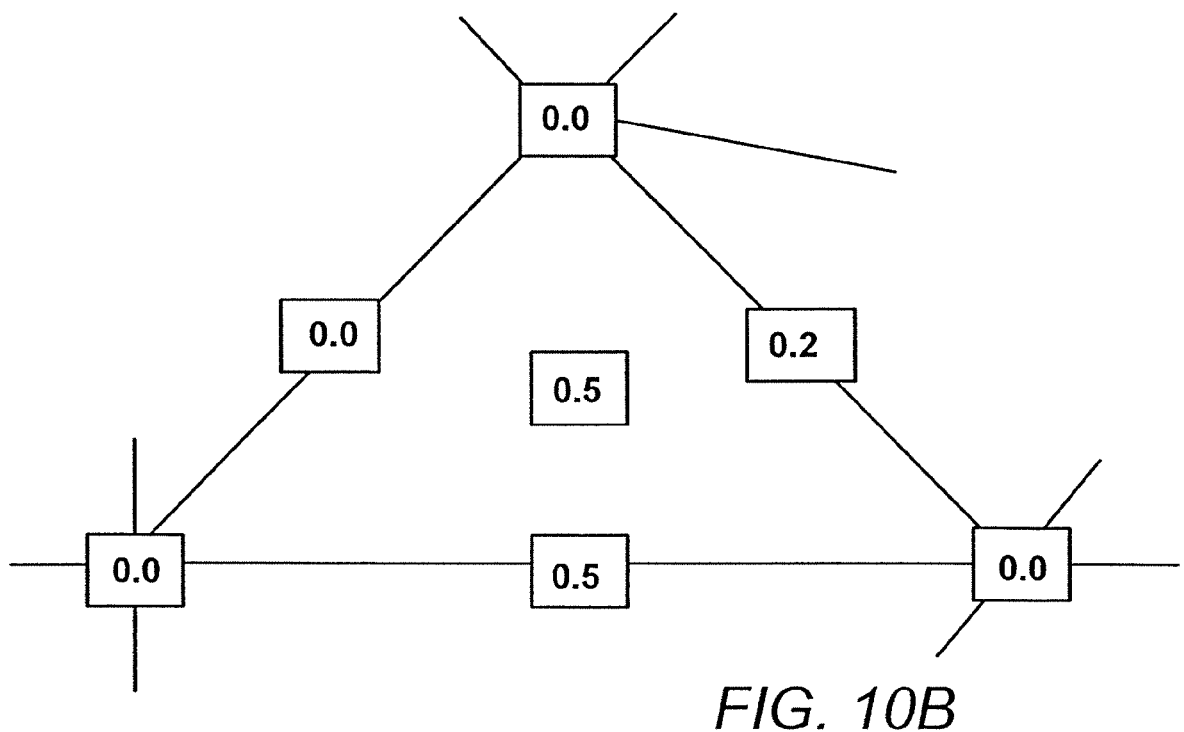

FIG. 10B is an example of the weight functions associated with the vertices, edges and centroid of the triangle in FIG. 10A associated with a visibility score of 0.5.

As can be seen from FIG. 10B the selection of weight function data for the vertices and edges of a triangle to be such that the weight function is the minimum of scores associated with triangles having a common edge or vertex ensures that the weight function associated with the edge or vertex of triangles adjacent to a triangle with a visibility score of zero are all set to zero.

By having the centre, edge and vertex of each triangle associated with weight function data, a means is provided to ensure that weight values subsequently associated with the edges of triangles can vary even when the vertices of a triangle associated with the same value. Thus for example in FIG. 10B the central portion of the base of the triangle is associated with a value of 0.5 whilst the two vertices at the base of the triangle are both associated with zero. If a simpler weight function were to be utilized and weights associated with positions along the edges of a triangle were to be solely determined by weights allotted to the vertices, this variation could not occur.

Returning to FIG. 9 after the weight function data has been determined and stored for the vertices, edges and centroid of the triangle currently under consideration the weight determination module 58 then determines (S9-5) whether the triangle currently under consideration is the last of the triangles in the model generated by the surface modeller 34.

If this is not the case the next triangle is then selected (S9-6) and weight function data is determined and stored for the newly selected triangle (S9-2-S9-4).

Thus in this way weight function data for generating a weight function that varies smoothly across the surface of a modelled object and reduces to zero for all portions of a model which are not visible from a viewpoint associated with the weight function is generated.

Returning to FIG. 4 after weight function data has been determined for each of the camera views corresponding to position data generated by the position determination module 32 this weight function data is then (S4-4) output by the weight determination module 58 to the texture map determination module 59 so that the texture map determination module 59 can utilize the calculated weight function data to select portions of image data to be utilized to generate texture maps for a generated model.

Generation of Texture Maps

Utilizing conventional texture rendering techniques, it is possible to generate image data corresponding to projected images as perceived from each of the canonical views 50-55 where the surface of a model of a subject object is texture rendered utilizing input image data identified as having been recorded from a camera viewpoint corresponding to position data output by the position determination module 32 for that image data.

It is also possible utilizing conventional techniques to generate projected images corresponding to the projection of the surface of a model texture rendered in accordance with calculated weight functions for the surface of the model as viewed from each of the canonical views 50-55 from the output weight function data.

As described above, the weight function data generated output by the weight determination module 58 are calculated so as to be representative of a relative visibility of portions of the surface of a model from defined viewpoints. The projected images of the weight functions are therefore indicative of relative preferences for using the corresponding portions of projections of image data from the corresponding viewpoints to generating the texture data for the texture map for each of the canonical views. These projected weight function images, hereinafter referred to as canonical confidence images can therefore be utilized to select portions of projected image data to blend to generate output texture maps for canonical views 50-55.

Figure 11:
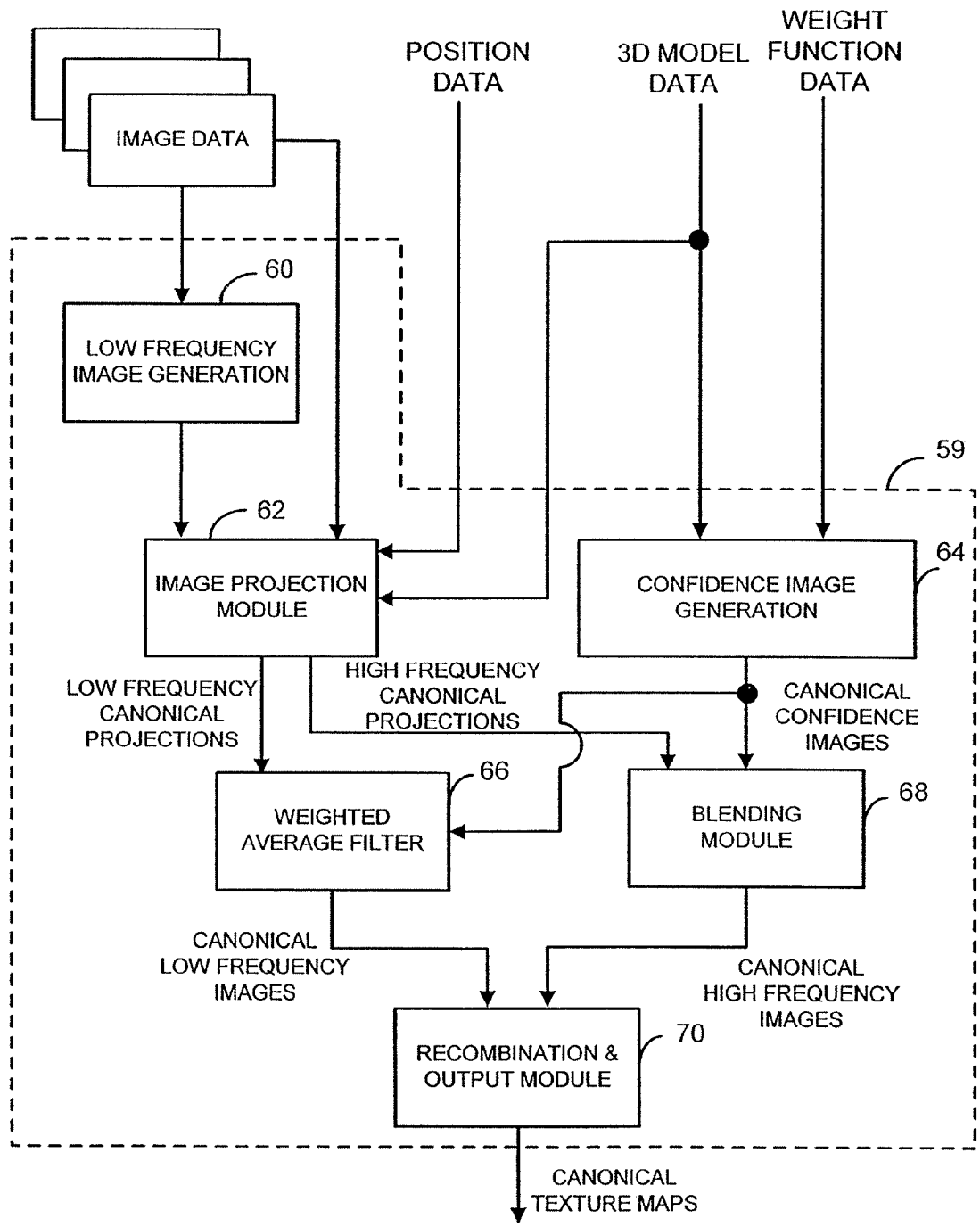
FIG. 11 is a schematic block diagram of a texture map determination module.

FIG. 11 is a schematic diagram of notional functional modules of the texture map determination module 59 for generating canonical texture maps for each of the canonical views 50-55 from image data stored within the input data store 26, position data output by the position determination module 32, 3D model data generated by the surface modeller 34 and the weight function data output by the weight determination module 58.

The applicants have appreciated that generation of realistic texture for a model of a subject object can be achieved by blending images in different ways to average global lighting effects whilst maintaining within the images high frequency details such as highlights and shadows.

Thus in accordance with this embodiment of the present invention the texture generation module 59 comprises a low frequency image generation module 60 for extracting low frequency image information from image data stored within the input data store 26, an image projection module 62 for generating high and low frequency canonical image projections; a confidence image generation module 64 for generating canonical confidence images; a weighted average filter 66 and a blending module 68 for processing high and low frequency canonical projections and the canonical confidence images to generate blended high and low frequency canonical images; and a re-combination of output module 70 for combining the high and low frequency images and outputting the combined images as texture maps for each of the canonical views 50-55.

In order to generate high and low frequency canonical projections of each of the input images stored within the input data store 26 projected into each of the six canonical views, initially each item of image data in the input data store 26 is passed to the low frequency image generation module 60.

This module 60 then generates a set of low frequency images by processing the image data for each of the views in a conventional way by blurring and sub-sampling each image. In this embodiment the blurring operation is achieved by performing a Gausian blur operation in which the blur radius is selected to be the size of the projection of a cube placed at the centre of the object bounding box defined by the six canonical views 50-55 and whose sides are 5% of the length of the diagonal of the bounding box. The selection of the blur radius in this way ensures that the radius is independent of image resolution and varies depending upon whether the image is a close up of a subject object (large radius) or the subject appears small in the image (small radius).

These low frequency images are then passed to the image projection module 62 together with copies of the original image data stored within the input data store 26, position data for each of the images as determined by the position determination module 32 and 3D model data for the model generated by the surface modeller 34.

For each of the input images from the input data store 26 the image projection module then utilizes the position data associated with the image and the 3D model data output by the surface modeller 34 to determine calculated projections of the input images as perceived from the six canonical views 50-55 by utilizing standard texture rendering techniques.

In the same way the image projection module 62 generates for each of low frequency images corresponding to image data processed by the low frequency image generation module 60, six low frequency canonical projections for the six canonical views 50-55.

Six high frequency canonical image projections for each image are then determined by the image projection module 62 by performing a difference operation, subtracting the low frequency canonical image projections for an image as viewed from a specified canonical view from the corresponding image projection of the raw image data for that view.

The low frequency canonical projections and high frequency canonical projections of each image for each of the six canonical views are then passed to the weighted average filter 66 and the blending module 68 for processing as will be detailed later.

By processing the image data from the input data store 26 in this way it is possible to ensure that the processing of images generates high and low frequency canonical projections of each image that are consistent with one another. In contrast, if a blurring operation is performed upon canonical image projections created from image data stored within the input data store 26, as the pixel data in these generated projections is normally dependent upon different regions of the original image data, the blurring operation will not be consistent across all six canonical images and hence will introduce errors into the generated texture maps.

The confidence image generation module 64 is arranged to receive 3D model data from the surface modeller 34 and weight function data from the weight function determination module 58. The confidence image generation module 64 then processes the 3D model data and weight function data to generate for each of the weight functions associated with viewpoints corresponding to the viewpoints of each input images in the input data store 26, a set of six canonical confidence images for the six canonical views 50-55.

Specifically each triangle for which weight function data has been stored is first processed by linking the midpoint of each edge of the triangle to the midpoints of the two other edges and linking each of the midpoints of each edge and the centroid of the triangle. Each of these defined small triangles, is then projected into the six canonical views with values for points corresponding to each part of the projection of each small triangle being interpolated using a standard OpenGL "smooth shading" interpolation from the weight function data associated with the vertices of these small triangles.

Thus in this way for each of the six canonical views, a canonical confidence image for each weight function is generated. The pixel values of canonical confidence images generated in this way are each representative of the relative preference for utilizing corresponding portions of canonical projections of image data representative of the viewpoint for which the weight function was generated to generate texture map data. These canonical confidence images are then passed to the weighted average filter 66 and the blending module 68, so that texture data for the six canonical views can be generated utilizing the data identifying preferred sources for generating portions of texture map data.

Thus after the processing of image data and weight function data by the low frequency image generation module 60, the image projection module 62 and the confidence image generation module 64, the weighted average filter 66 and blending module 68 receive, for each item of image data stored within the input data store 26 a set of six canonical confidence images identifying the extent to which portions of projected images derived from a specified image are to be preferred to generate texture data and a set of six projections of either the high or low frequency images corresponding to the item of image data. The weighted average filter 66 and the blending module 68 then proceed to process the confidence images and associated low and high frequency canonical projections in turn for each of the canonical views as will now be described in detail.

Processing of Low Frequency Canonical Projections

Figure 12:
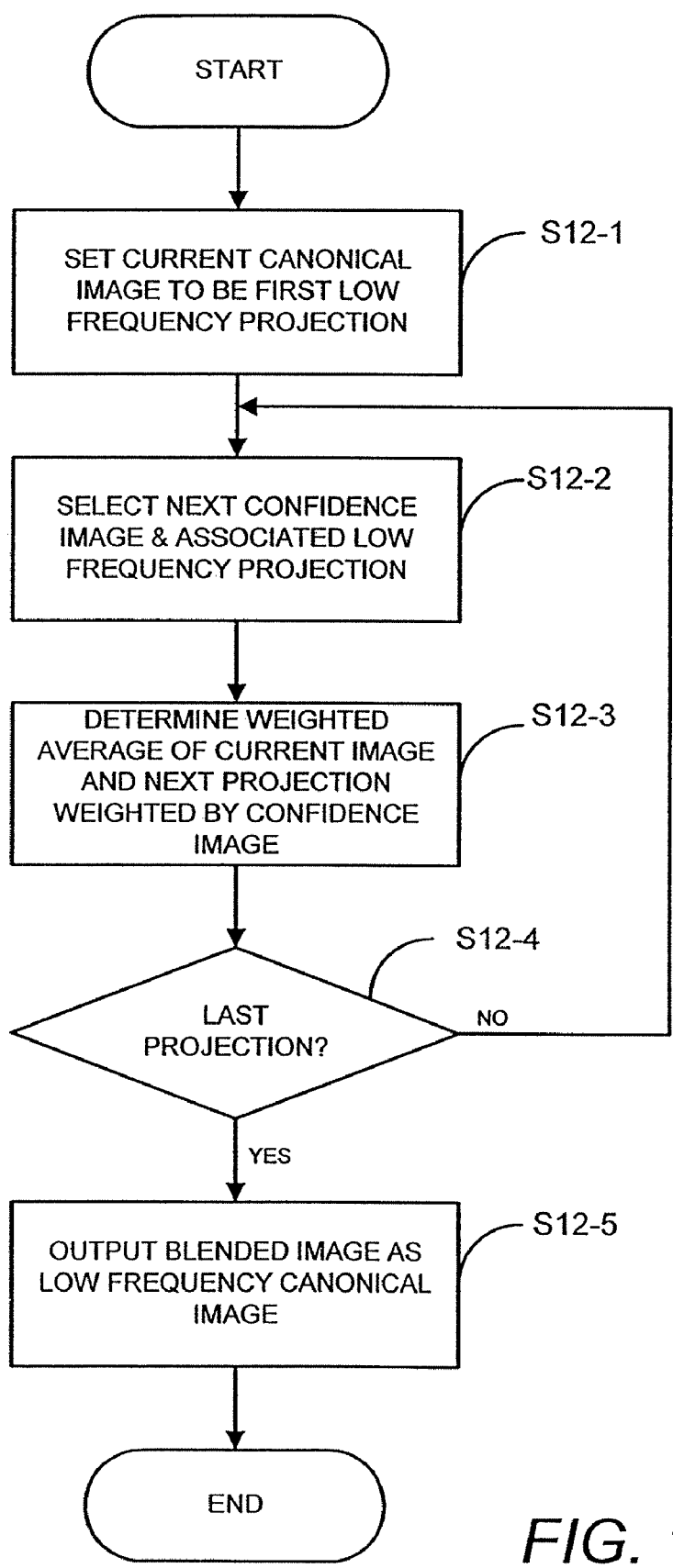
FIG. 12 is a flow diagram of the processing of low frequency canonical projections.

FIG. 12 is a flow diagram of the processing of low frequency canonical projections and associated canonical confidence images for a specified canonical view for each of a set of input images stored within the input data store 26.

Initially (S12-1) the weighted average filter 66 selects a first low frequency canonical projection and its associated confidence image. This is then made the basis of an initial low frequency canonical image to be generated by the weighted average filter 66. The weighted average filter 66 then selects (S12-2) the next low frequency projection for the same canonical view together with the projection's associated confidence image.

The weighted average filter 66 then (S12-3) determines as a new low frequency canonical image a canonical image comprising for each pixel in the image a weighted average of the current low frequency canonical image and the selected low frequency canonical projection weighted by the confidence scores utilising the following formula:

$$\text{pixel value} = \frac{C_i}{C+C_i} * \left[ \begin{array}{c} \text{Pixel Value in} \\ \text{selected projection} \end{array} \right] + \frac{C}{C+C_i} * \left[ \begin{array}{c} \text{Pixel Value} \\ \text{in canonical image} \end{array} \right]$$

where C is the current confidence score associated with the pixel being processed for the canonical image and $C_i$ is the confidence score associated with the pixel in the confidence image associated with the selected projection.

The confidence score for the pixel in the canonical image is then updated by adding the confidence score for the latest projection to be processed to the current confidence score. That is to say the new confidence score $C_{new}$ is calculated by the equation $$C_{new} = C_{old} + C_i$$

where $C_{old}$ is the previous confidence score associated with the current pixel and $C_i$ is the confidence score of the current pixel in the projection being processed.

The weighted average filter 66 then (S12-4) determines whether the latest selected low frequency canonical projection is the last of the low frequency canonical projections for the canonical view currently being calculated. If this is not the case the weighted average filter 66 then proceeds to utilize the determined combined image to generate a new combined image utilizing the next confidence image and associated low frequency image projection (S12-2-S12-4).

When the weighted average filter 66 determines (S12-4) that the last of the low frequency canonical projections for a specified canonical view 50-55 has been processed the weighted average filter 66 outputs (S12-5) as a blended canonical low frequency image the image generated utilizing the weighted average of the last projected image processed by the average weighted filter 66.

Thus in this way the weighted average filter 66 enables for each of the canonical views 50-55 a low frequency image to be created combining each of the low frequency canonical projections weighted by confidence scores indicative of the portions of the images identified as being most representative of the surface texture of a model in the canonical confidence images. As the low frequency images are representative of average local colour of surfaces as effected by global lighting effects, this processing by the weighted average filter 66 enables canonical low frequency images to be generated in which these global lighting effects are averaged across the best available images where greater weight is placed on images in which portions of a model are most easily viewed giving the resultant canonical low frequency images a realistic appearance and a neutral tone.

Processing of High Frequency Canonical Projections

Figure 13:
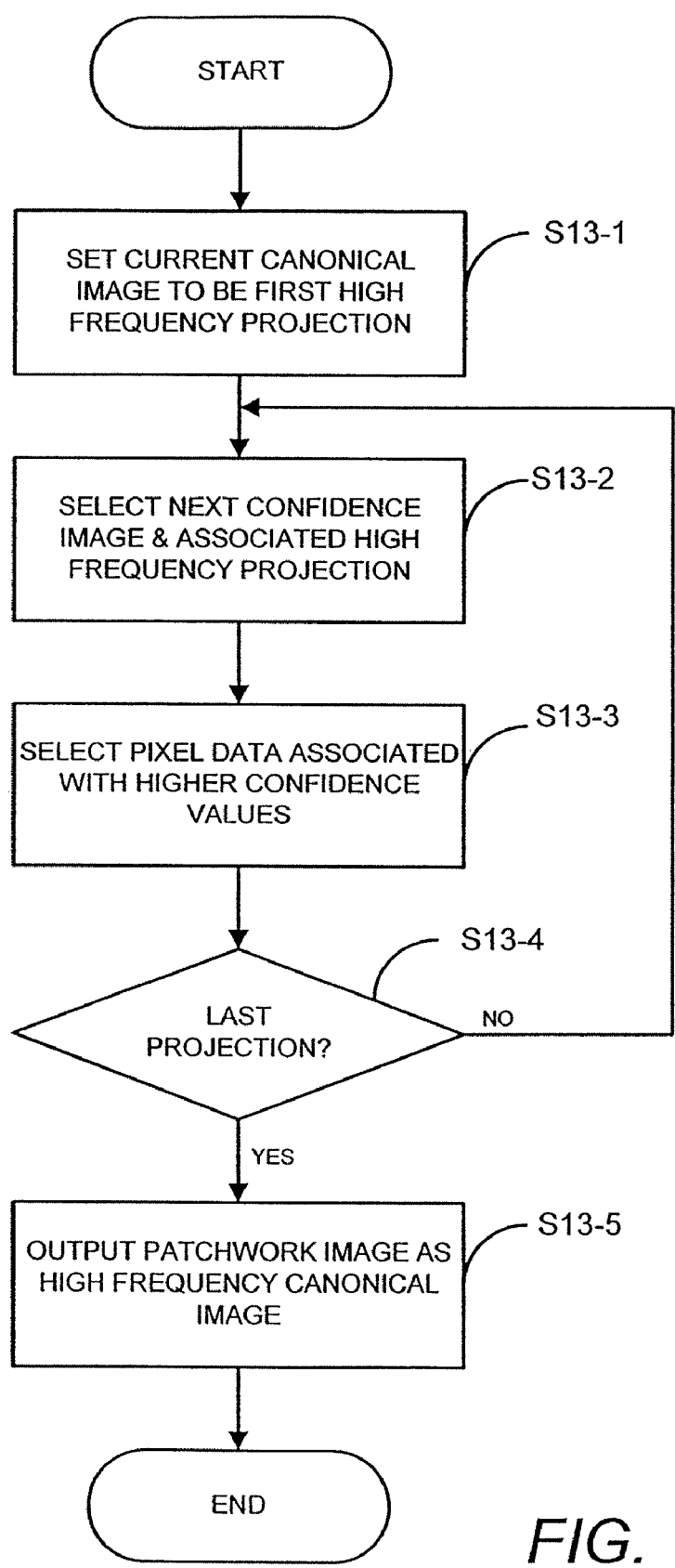
FIG. 13 is a flow diagram of the processing of high frequency canonical projections.

FIG. 13 is a flow diagram of the processing of canonical confidence images and associated high frequency canonical projections for generating a canonical high frequency image for one of the canonical views 50-55. This processing is repeated for each of the canonical views 50-55.

The processing of the blending module 68 for generating high frequency canonical images is identical to that of the processing of the weighted average filter 66 except instead of determining weighted averages of pixels in the canonical projections and canonical images, in this embodiment the blending module 68 selects as canonical image data pixel data, pixel data associated with the greatest confidence scores.

Specifically, after selecting an initial high frequency projection and associated confidence image to be the initial high frequency canonical image and associated confidence image (S13-1) and selecting the next projection and confidence image for processing (S13-2), the blending module 68 then updates the pixels in the current high frequency canonical image (S13-3).

This is achieved by the blending module 68 selecting for each pixel in the image either pixel data for the corresponding pixel in the high frequency canonical projection being processed or the pixel data for the current high frequency canonical image. The selection is made for each pixel by determining whether the corresponding pixel in the confidence image associated with the high frequency projection being processed has a greater confidence score than the confidence score associated with the pixel in the current canonical image. The pixel data associated with the highest score is then utilised as pixel data for the canonical image. The confidence score associated with the pixel in the updated canonical image is then set to the greater of the confidence scores for the pixel as identified by either the confidence image associated with the canonical image or the projection currently be processed.

The blending module 68 then determines (S13-4) whether all of the high frequency image projections for a canonical user have been processed. If this is not the case then the next projection and confidence image are utilised to update the high frequency canonical image being generated (S13-2-S13-4). When all of the canonical projections have been processed the final canonical image is then output (S13-5).

Thus in this way a high frequency canonical image is generated utilising all of the available high frequency image projections where each pixel of the high frequency canonical image corresponds to pixel data from the available high frequency image projections associated with the greatest of the confidence scores for that pixel As the confidence scores are indicative of the relative goodness for selecting pixels for generating image data, the high frequency canonical images therefore correspond to a patchwork of the best available pixel data for each part of the high frequency canonical images Thus in this way six low frequency canonical images for the six canonical views 50-55 and six high frequency canonical images are generated by the weighted average filter 66 and the blending module 68 respectively. In the canonical low frequency images the global lighting effects are averaged across the available low frequency canonical projections in proportion to the relative preference for utilizing portions of an image as identified by the canonical confidence images associated with the projections. In the high frequency canonical images, high frequency canonical projections are selected in the above described manner to ensure that high frequency detail and contrast in the canonical images is maintained when the different high frequency canonical projections are combined.

When the six canonical low frequency images and six canonical high frequency images are then received by the recombination output module 70 for each canonical view 50-55 the recombination and output module 70 generates a single canonical texture map by adding the high and low frequency images for each view. The combined canonical texture maps are then output by the recombination and output module 70 for storage in the output data store 44 together with the 3D model data generated by the surface module 34.

The output canonical texture maps can then be utilized to texture render image representations of the model generated by the surface modeller 34 by associating each of the triangles identified by the three-dimensional model data with one of the texture maps. In this embodiment the selection of texture data to texture render each triangle is determined by selecting as the map to be utilized the map in which the triangle has the greatest visibility score in which the visibility score is calculated for each canonical view 50-55 in the same way as has previously been described in relation to FIG. 5. Texture co-ordinates for texture rendering the model generated by the surface modeller 34 are then implicitly defined by the projection of the triangle onto the selected canonical view 50-55.

Images of the model of the subject object can then be obtained for any viewpoint utilizing the output canonical texture maps and the 3D model data stored in the output data store 44, for display on the display device 4 and a hard copies of the generated images can be made utilizing the printer. The model data and texture map stored in the output data store 44 can also be output as data onto a storage device 46, 48.

Second Embodiment

In the first embodiment of the present invention, an image processing apparatus was described in which input data defining a plurality of images of a subject object recorded from different viewpoints were processed to generate texture data comprising six canonical texture maps being views for a cuboid bounding a model of the subject object. Although generating texture maps in this way ensures that the total number of required view is limited to six, this does not guarantee that every triangle within the model is visible in at least one of the canonical views. As a result, some portions of a model may be texture rendered utilizing surface information corresponding to a different portion of the surface of the model. In this embodiment of the present invention an image processing apparatus is described in which texture data is generated to ensure that all triangles within a 3D model are rendered utilizing texture data for the corresponding portion of the surface of a subject object, if image data representative of the corresponding portion of the subject object is available.

The image processing apparatus in accordance with this embodiment of the present invention is identical to that of the previous embodiment except the surface texturer 36 is replaced with a modified surface texturer 80.

Figure 14:
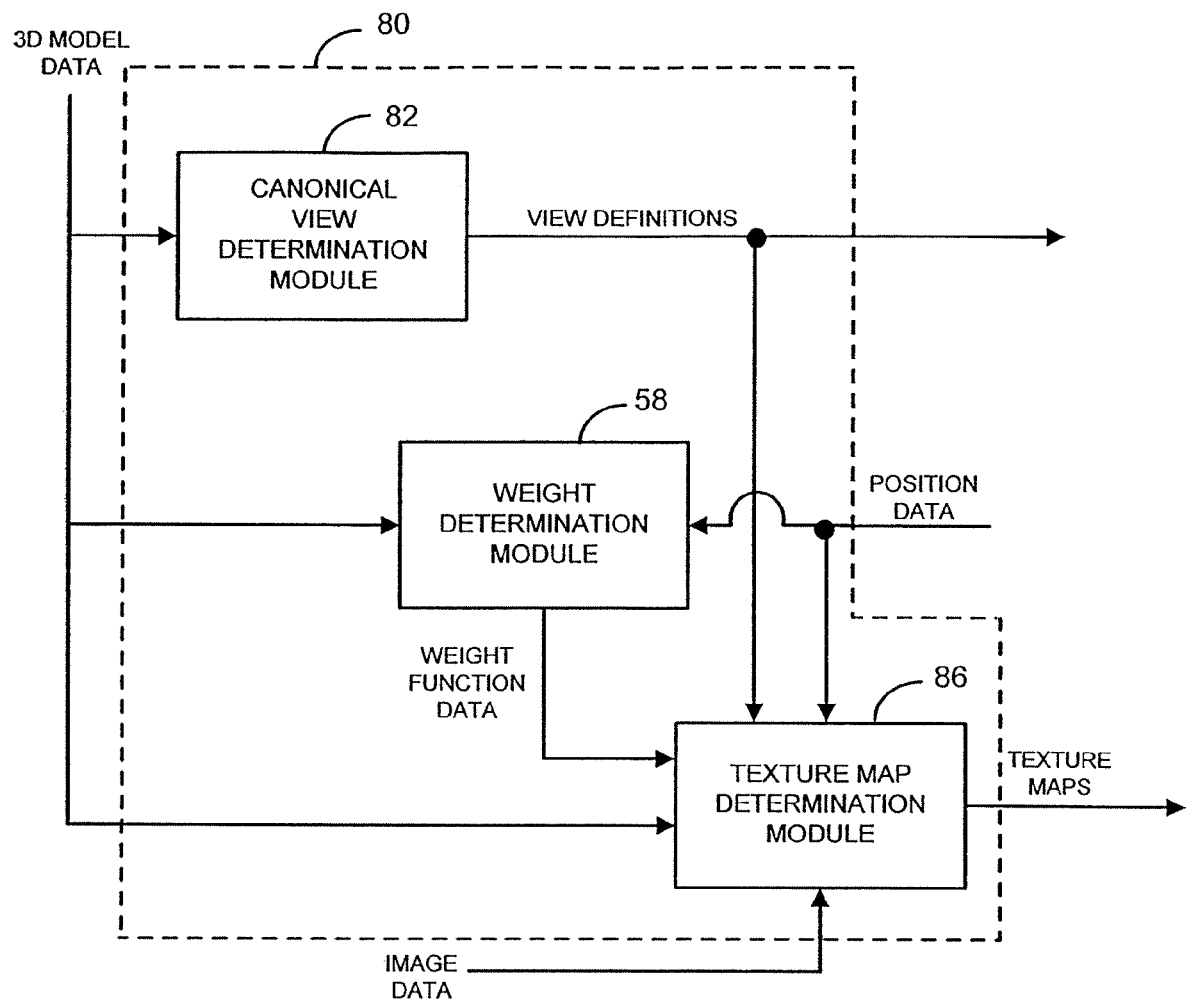
FIG. 14 is a schematic block diagram of a surface texturer in accordance with a second embodiment of the present invention.

FIG. 14 is a schematic block diagram of the notional functional modules of the modified surface texturer module 80. The modified surface texturer 80 comprises a canonical view determination module 82; a weight determination module 58 identical to the weight determination module 58 of the surface texturer 36 of the previous embodiment and a modified texture map determination module 86.

In this embodiment the canonical view determination module 82 is arranged to determine from the 3D model data output by the surface modeller 34 whether any portions of the surface of the 3D model are not visible from the six initial canonical views. If this is determined to be the case the canonical view determination module 82 proceeds to define further sets of canonical views for storing texture data for these triangles. These view definitions are then passed to the texture map determination module 86. The modified texture map determination module 86 then generates canonical texture map data for the initial canonical views and these additional canonical views which are then utilized to texture render the surface of the model generated by the surface modeller 34.

Figure 15:
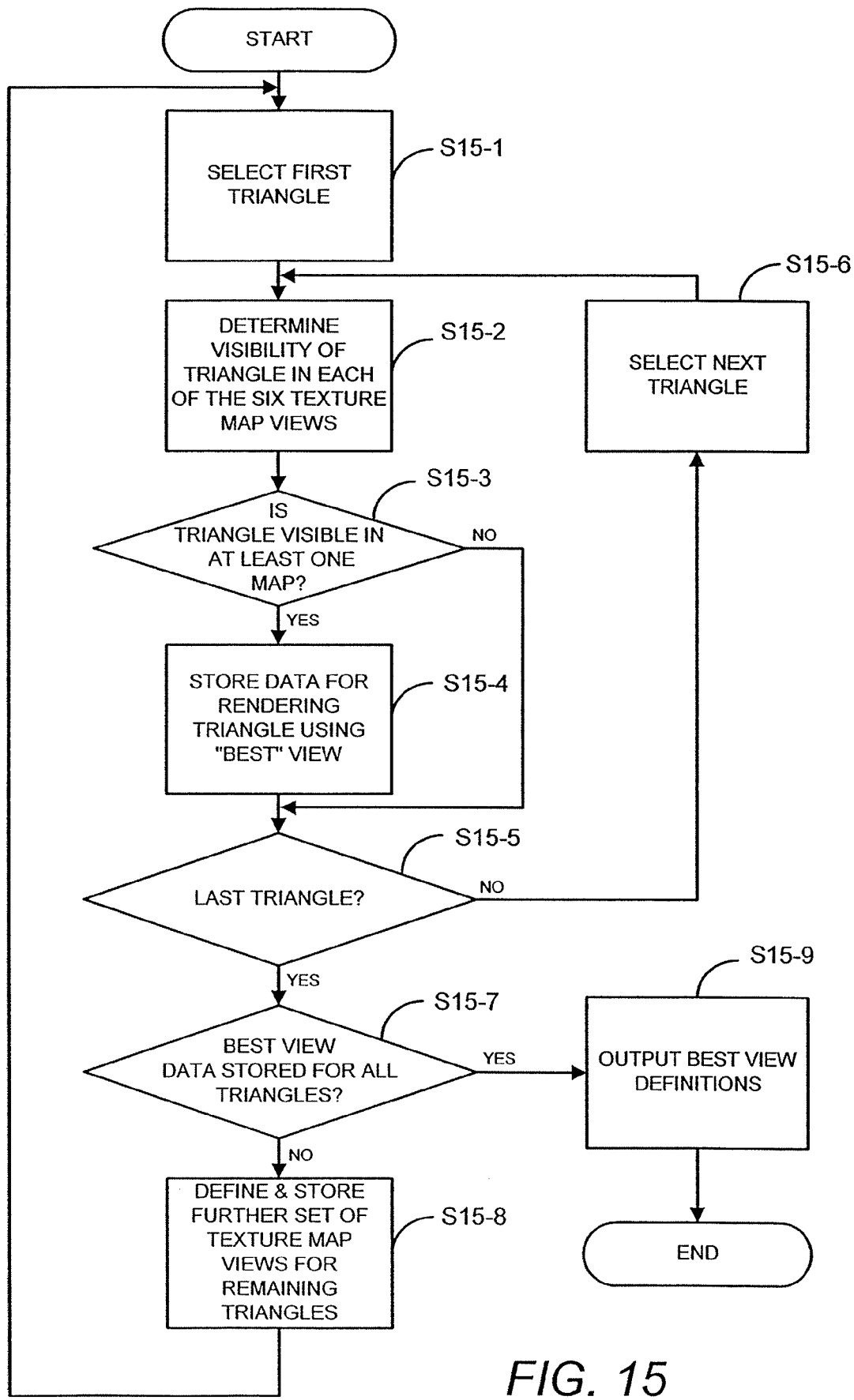
FIG. 15 is a flow diagram of the processing of the canonical view determination module the surface texturer of FIG. 14.

The processing of the canonical view determination module 82 in accordance with this embodiment of the present invention will now be described with reference to FIG. 15 which is a flow diagram of the processing of the canonical view determination module 82.

Initially (S15-1) the canonical view determination module 82 selects a first triangle of the model generated by the surface modeller 34. The canonical view determination module 82 then (S15-2) generates a visibility value and visibility score for the triangle as perceived from each of the six canonical views in a similar manner to which the visibility value is generated by a weight determination module 58 as has previously been described in relation to the previous embodiment.

The canonical view determination module 82 then (S15-3) determines whether the visibility value associated with the triangle being processed is greater than a threshold value indicating that the triangle is at least substantially visible in at least one of the views. In this embodiment this threshold value is set to zero so that all triangles which are at least 75% visible in one of the views are identified as being substantially visible.

If the canonical view determination module 82 determines that the triangle being processed is visible i.e. has a visibility value of greater than zero in at least one view, the canonical view determination module selects from the available canonical views the view in which the greatest visibility score as generated in the manner previously described is associated with the triangle. Data identifying the canonical view in which the selected triangle is most visible is then stored. Thus in this way data identifying the canonical view in which texture data for rendering the triangle is subsequently to be utilized is generated.

The canonical view determination module 82 then (S15-5) determines whether the currently selected triangle corresponds to the last triangle of the 3D model generated by the surface modeller 34. If this is not the case the canonical view determination module 82 then proceeds to select the next triangle and determine visibility values and visibility scores for that next triangle (S15-6-S15-5).

When the canonical view determination module 82 determines that all of the triangles have been processed (S15-5) the canonical view determination module 82 then (S15-7) determines whether data identifying a best view has been stored for all of the triangles.

If this is not the case the canonical view determination module 82 generates and stores a list of triangles for which no best view data has been stored (S15-8) the canonical view determination module 82 then proceeds to establish the visibility of these remaining triangles in the six canonical views in the absence of the triangles for which best view data has already been stored (15-1-S15-7). This process is then repeated until best view data is stored for all of the triangles.

When the canonical view determination module 82 determines (S15-7) that best view data has been stored for all the triangles the canonical view determination module 82 then outputs (S15-9) view definition data comprising for each triangle the canonical view in which it is most visible together with the generated lists of the triangles not visible canonical views. These lists and identified views in which the triangles are best represented are then output and passed to the modified texture map determination module 86.

When the modified texture map determination module 86 processes the 3D model data, weight function data, image data and position data this generates the six original canonical views in the same manner as has been described in relation to the first embodiment.

However, additionally the texture map determination module 86 generates for the triangles not visible in the original six canonical views as identified by the lists output by the canonical view determination module 82 further texture maps corresponding to the projection of the triangles identified by the lists of triangles generated by the canonical view determination module 82 in the six canonical views in the absence of the other triangles. These additional canonical views are generated from the high and low frequency canonical projections of image data generated by the image projection module 62 of the modified texture map determination module 86 and additional canonical confidence images being canonical projections of only the triangles identified by the lists of triangles output by the canonical view determination module 82. These additional confidence images being calculated for the triangles identified in the lists utilizing the weight function data generated by the weight determination module 58 in the same way as has previously been described in relation to the first embodiment.

Thus in this way additional texture maps are generated for those portions of the surface of the model which are not apparent in the original six canonical views. As these partial additional texture maps are generated in a similar way to the main canonical views they should also be representative of projections of portions of an image and hence suitable for compression utilizing the standard image compression techniques.

The original canonical views together with these additional canonical views can then be utilized to texture render the model where the texture maps utilized to render each triangle is selected utilizing the lists and the data identifying the best views as are output by the canonical view determination module 82.

Third Embodiment

A third embodiment of the present invention will now be described. In the first embodiment a blending module 68 was described which selected pixel data corresponding to the pixels associated with the highest confidence scores for the corresponding pixel in associated confidence images. A problem with such a selection system is that boundaries can develop in the generated texture map data indicative of the selection of pixel data from different image sources. The obvious solution to this problem performing an average operation such as that performed by the weighted average filter 66 is undesirable as this results in loss of contrast within the texture maps data. In this embodiment the blending module 68 is arranged to process high frequency canonical projections in a way which avoids noticeable boundaries arising within texture map data, whilst maintaining image contrast.

Figure 17:
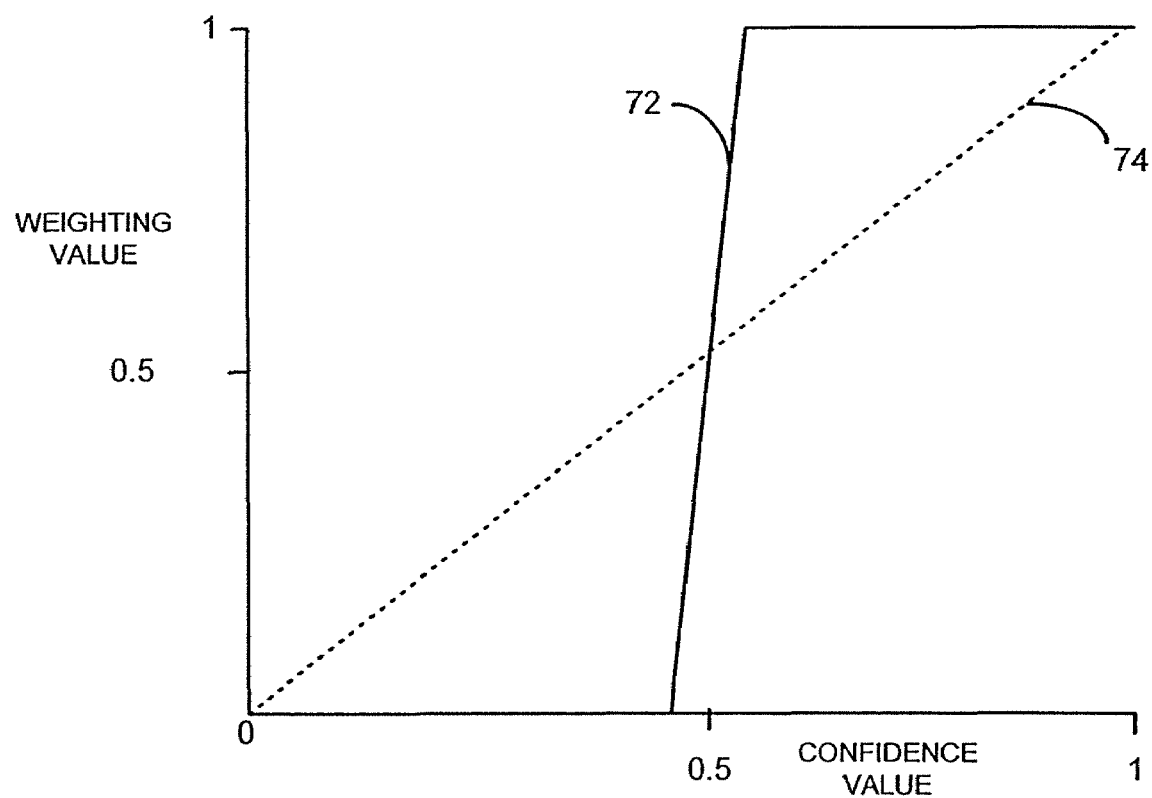
FIG. 17 is a graph illustrating generated blend functions.

FIG. 17 is a flow diagram of the processing canonical confidence images and associated high frequency canonical image projections by the blending module 68 in accordance with this embodiment of the present invention.

Initially (S16-1) the blending module 68 selects a first one of the high frequency canonical projections for the canonical view for which a canonical high frequency image is to be generated and sets as an initial canonical high frequency image an image corresponding to the selected first high frequency projection.

The blending module 68 then (S16-2) selects the next high frequency canonical projection for that canonical view and its associated canonical confidence image for processing.

The first pixel within the canonical high frequency image is then selected (S16-3) and the blending module 68 then (S16-4) determines for the selected pixel in the high frequency canonical image a difference value between the pixel in the current high frequency canonical image and in the corresponding pixel in the high frequency canonical projection being processed.

In this embodiment, where the high frequency canonical projections and canonical high frequency image comprise colour data, this difference value may be calculated by determining the sum of the differences between corresponding values for each of the red, green and blue channels for the corresponding pixels in the selected high frequency canonical projection and the canonical high frequency image being generated.

Alternatively, where the image being processed comprises grey scale data, this difference value could be determined by calculating the difference between the pixel in the canonical high frequency image and the corresponding pixel in the high frequency canonical projection being processed.

It will be appreciated that more generally in further embodiments of the invention where colour data is being processed any suitable function of the red, green and blue channel values for corresponding pixels in the high frequency canonical projection being processed and the canonical high frequency image being generated could be utilized to generate a difference value for a pixel.

After the difference value for the pixel being processed has been determined, the blending module 68 then (S16-5) determines a blend function for the selected pixel from the confidence scores associated with the pixel and the determined difference value for the pixel.

In this embodiment this blend function is initially determined by selecting a gradient G in dependence upon the determined difference value for the pixel. Specifically, in this embodiment the value G is calculated by setting $$G = \frac{D}{D_0} \text{ for } D \geq D_0$$

$$G = 1 \text{ for } D < D_0$$

where D is the determined difference value for the pixel and $D_0$ is a blend constant fixing the extent to which weighting factors are varied due to detected differences between images. In this embodiment where the difference values D are calculated from colour image data for three colour channels each varying from 0 to 255, the value of $D_0$ is set to be 60.

An initial weighting fraction for calculating a weighted average between the pixel being processed in the current canonical high frequency image and the corresponding pixel in the high frequency canonical projection being processed is then set by calculating:

$$W_0 = \left(\frac{C_i}{C + C_i} - 0.5\right)G + 0.5$$

where $C_i/(C+C_i)$ is the relative confidence score associated with the pixel being processed in the confidence image associated with the selected high frequency canonical projection being the ratio of the confidence score $C_i$ associated with the pixel in the current image being processed to the confidence score associated with the pixel by the canonical image and G is the gradient determined utilizing the determined difference value D for the pixel.

A final weighting fraction is then determined by setting the weighting value W with:

W=0 if $W_o$<0

W=1 if $W_o$>1; and

W=$W_o$ if 0≦$W_o$≦1

FIG. 14 is a graph of a generated blend function illustrating the manner in which the final weighting value W calculated in this way varies in dependence upon the relative confidence score $C_i/(C+C_i)$ for a pixel being processed and the determined difference value D for the pixel.

In the graph as illustrated, solid line 72 indicates a graph for calculating W for weighting values where D is equal to a high value, for example in this embodiment where D ranges between 0 and 765 a value of over 700. As such the graph indicates that where the relative confidence score for a particular source is low a weighting value of zero is selected and for high pixel confidence scores, a weighting factor of one is selected. For intermediate pixel confidence scores an intermediate weighting factor is determined, the weighting factor increasing as the confidence score increases.

The dotted line 74 in FIG. 17 is an illustration of the blend function where the calculated value D for the difference between the image data of the first and second images for a pixel is less than or equal to the blend constant $D_0$. In this case the blend function comprises a function which sets a weighting value equal to the pixel relative confidence score for the pixel.

For intermediate values of D, the blend function varies between the solid line 72 and the dotted line 74 with the thresholds below which or above which a weighting value of zero or one is output reducing and increasing as D decreases. Thus as D decreases the proportion of relative confidence scores for which a weighting value other than zero or one is output increases.

Figure 16:
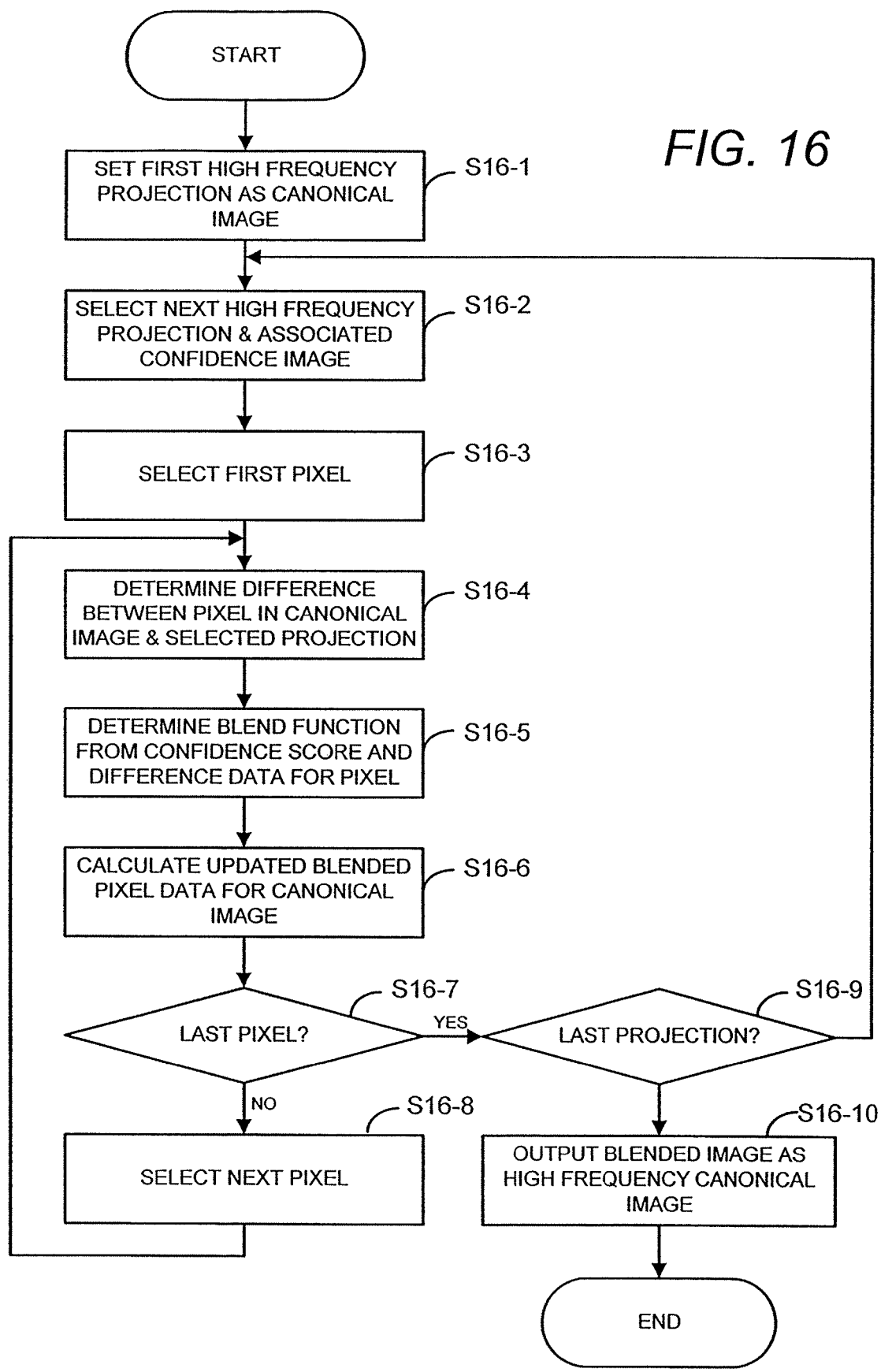
FIG. 16 is a flow diagram of the processing of high frequency canonical projections in accordance with a third embodiment of the present invention.

Returning to FIG. 16, after a final weighting value W has been determined the blending module 68 then proceeds to calculate and store blended pixel data (S16-6) for the pixel under consideration. In this embodiment, where the image data comprises colour image data, the calculated blended pixel data is determined for each of the three colour channels by:

$$\text{New pixel Value} = W \begin{bmatrix} \text{pixel value in} \\ \text{selected image} \end{bmatrix} + (1-W) * \begin{bmatrix} \text{pixel value in} \\ \text{canonical image} \end{bmatrix}$$

The confidence value associated with the blended pixel is then also updated by selecting and storing as a new confidence score for the pixel the greater of the current confidence score associated with the pixel in the canonical image and the confidence score of the pixel in the projection being processed.

The effect of calculating the pixel data for pixels in the high frequency canonical image in this way is to make the pixel data dependent upon both the difference data and the confidence data associated with the processed pixel in the selected high frequency canonical projection. Specifically, where the difference data for a pixel is low (i.e. less than or equal to the blend constant $D_0$) calculated pixel data corresponding to a weighted average proportional to the relative confidence score for the pixel in the associated canonical image is utilized. Where difference data is higher (i.e. greater than the blend constant $D_0$) a pair of threshold values are set based upon the actual value of the difference data. Pixel data is then generated in two different ways depending upon the relative confidence score for the pixel in the associated canonical image. If the relative confidence score is above or below these threshold values either only the original pixel data for the canonical image or the pixel data for the selected high frequency canonical projection is utilized as a composite image data. If the relative confidence score is between the threshold values a weighted average of the original pixel data and pixel data from the selected projection is utilized.

After the generated pixel data has been stored, the blending module 68 then determines (S16-7) whether the pixel currently under consideration is the last of the pixels in the canonical image. If this not the case the non-linear averaging filter then (S16-8) selects the next pixel and repeats the determination of a difference value (S16-4) a blend function (S16-5) and the calculation and storage of pixel data (S16-6) for the next pixel.

If after generated pixel data and a revised confidence score has been stored for a pixel the blending module 68 determines (S16-7) that blended pixel data has been stored for all of the pixels of the high frequency canonical image, the blending module 68 then determines (S16-9) whether the selected high frequency canonical projection and associated confidence image is the last high frequency canonical projection and confidence image to be processed. If this is not the case the next high frequency canonical projection is selected (S16-2) and the canonical high frequency image is updated utilizing this newly selected projection (S16-3-S16), and its associated confidence image.

When the blending module 68 determines that the latest high frequency canonical projection utilized to update a canonical high frequency image is the last of the high frequency canonical projections, the blending module 68 then (S16-10) outputs as a high frequency image for the canonical view 50-55 the high frequency canonical image updated by the final high frequency projection.

The applicants have realized that the undesirable effects of generating composite image data by determining a weighted average of pixels from high frequency image data including data representative of details arise in areas of images where different items of source data differ significantly. Thus for example, where highlights occur in one source image at one point but not at the same point in another source image, averaging across the images results in a loss of contrast for the highlight. If the highlights in the two images occur at different points within the two source images, averaging can also result in the generation of a 'ghost' highlight in another portion of the composite image. Similarly, where different items of source data differ significantly other undesirable effects occur at points of shadow, where an averaging operation tends to cause an image to appear uniformly lit and therefore appear flat.

In contrast to areas of difference between source images, where corresponding points within different source images have a similar appearance, an averaging operation does not degrade apparent image quality. Performing an averaging across such areas of composite image, therefore provides a means by which the relative weight attached to different sources of image data can be varied so that the boundaries between areas of a composite image obtained from different source images can be made less distinct.

Thus in accordance with this embodiment of the present invention weighting factors are selected on the basis of both confidence data and difference data for a pixel so that, relative to weighting factors proportional to confidence data only as occurs in the weighted average filter 66, in the blending module 68, where determined differences between the source images are higher, the weighting given to preferred source data is increased and the corresponding weighting given to less preferred data is decreased.

Thus, where both confidence data and difference data are high, a greater weight is given to a particular source or alternatively only the preferred source data is utilized to generate composite image data. As these areas correspond to areas of detail and highlights or shadow in the high frequency images the detail and contrast in the resultant generated data is maintained.

In areas where there is less difference between different sources of image data, weighting values proportional to confidence data are not modified at all or only slightly so that the boundaries between portions of image data generated from different images are minimised across those areas. Thus in this way composite image data can be obtained which maintains the level of contrast and detail in original high frequency source data, whilst minimising apparent boundaries between portions of composite image generated from different items of source data.

In the above embodiments, a set of images of a subject object is described as being utilized to generate 3D model data and texture render data for generating representations of that subject object. However, texture render data obtained utilizing images of one object could for example be utilized to generate representations of a second object. The mixing of a model obtained for one object and texture derived from a second object could be utilized to establish how the application of texture from different objects varies the appearance of a model.

Specifically, confidence images of a first object from any number of views can be generated in a similar manner as has previously been described. Source images of a different object can then be processed using the confidence images as if the source images had been generated. The processing of the source images in this way would then generate texture data in which the texture in the source images was blended smoothly across the surface of the first object.

Thus for example a number of confidence images could be generated for views of a model. The confidence images of the model viewed from viewpoints to one side of the model might be associated with an image of a first texture for example a wood grain. The remaining confidence images of the model might be associated with a second texture e.g. marble. Processing these two source images with the generated confidence images would generate texture data in which one side of the model appeared having a wood grain texture and the other a marble texture with the two textures being smoothly blended across the surface of the model.

Alternatively, instead of using only a limited number of texture images, images of a different object as viewed from viewpoints for which confidence images were generated could be used. Thus for example, images of a model first object could be generated as has previously been described for a number of viewpoints. Confidence images for a second object could be generated for those corresponding viewpoints and texture data for the second object obtained by processing the images of the first object utilizing the confidence images of the second object.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes

The invention claimed is:

1. A method of processing image data defining a plurality of images of a subject object recorded at different positions relative thereto and data defining the relative positions of the images, to generate data defining a three-dimensional computer surface shape model of the subject object and texture maps defining texture data for the surface shape model, the method being performed in a processing apparatus and comprising:

processing the image data and the data defining the relative positions to generate data defining a polygon mesh representing the surface shape of the subject object;

defining a plurality of texture map images, each representing a view of the polygon mesh from a respective viewing direction;

processing the polygon mesh and the texture map images to test the visibility of the polygons in the texture map images and to generate, in dependence thereon:

data defining the polygons in the mesh for which the visibility in each texture map image is less than a threshold; and data defining texture coordinates in a texture map image for each other polygon in the polygon mesh;

generating texture data for each texture map image in dependence upon the image data, and storing the generated data as texture maps for the polygon mesh; and generating texture data for the identified polygons in the mesh for which the visibility in each texture map image is less than the threshold in dependence upon the image data, and storing the generated texture data as at least one further texture map for the polygon mesh, wherein, in the processing to test the visibility of the polygons in the texture map images, each polygon is tested to determine the proportion thereof which is visible in a texture map image, and wherein each polygon is tested to determine the proportion thereof which is visible in a texture map image by;

rendering an image of the polygon mesh into the texture map image using Z-buffering to generate pixel values and depth data for each pixel;

rendering the polygon to be tested into the texture map image in a first colour without using Z-buffering, thereby changing the existing pixel values but not the existing depth data; and rendering the polygon to be tested into the texture map image in a second colour using Z-buffering, thereby to change the existing pixel values.

2. A method according to claim 1, wherein, in the processing to test the visibility of the polygons in the texture map images, polygons are tested in dependence upon their respective angles with the texture map images.

3. A method according to claim 1, wherein six texture map images are defined, the six texture map images comprising views of the subject object from the six faces of a cuboid enclosing the subject object.

4. A method according to claim 1, further comprising compressing the data defining the texture maps and the further texture map.

5. A method according to claim 1, further comprising outputting a signal defining the texture maps and the further texture map.

6. A method according to claim 5, further comprising making a recording of the signal either directly or indirectly.

7. An image processing apparatus operable to process image data defining a plurality of images of a subject object recorded at different positions relative thereto and data defining the relative positions of the images, to generate data defining a three-dimensional computer surface shape model of the subject object and texture maps defining texture data for the surface shape model, the apparatus comprising:

a polygon mesh generator operable to process the image data and the data defining the relative positions to generate data defining a polygon mesh representing the surface shape of the subject object;

a texture map image generator operable to generate data defining a plurality of texture map images, each representing a view of the polygon mesh from a respective viewing direction;

a visibility tester operable to process the polygon mesh and the texture map images to test the visibility of the polygons in the texture map images and to generate, in dependence thereon:
- data defining the polygons in the mesh for which the visibility in each texture map image is less than a threshold; and
- data defining texture coordinates in a texture map image for each other polygon in the polygon mesh;

a texture generator operable to:
- generate texture data for each texture map image in dependence upon the image data, and to store the generated data as texture maps for the polygon mesh; and
- generate texture data for the identified polygons in the mesh for which the visibility in each texture map image is less than the threshold in dependence upon the image data, and to store the generated texture data as at least one further texture map for the polygon mesh, wherein the visibility tester is operable to test each polygon to determine the proportion therefore which is visible in a texture map image, and wherein the visibility tester is operable to test each polygon to determine the proportion thereof which is visible in a texture map image by:
- rendering an image of the polygon mesh into the texture map image using Z-buffering to generate pixel values and depth data for each pixel;
- rendering the polygon to be tested into the texture map image in a first colour without using Z-buffering, thereby changing the existing pixel values but not the existing depth data; and
- rendering the polygon to be tested into the texture map image in a second colour using Z-buffering, thereby to change the existing pixel values.

8. Apparatus according to claim 7, wherein the visibility tester is operable to test polygons in dependence upon their respective angles with the texture map images.

9. Apparatus according to claim 7, wherein the texture map image generator is operable to define six texture map images, the six texture map images comprising views of the subject object from the six faces of a cuboid enclosing the subject object.

10. Apparatus according to claim 7, further comprising a data compressor operable to compress the data defining the texture maps and the further texture map.

* * * * *